US009886086B2

(12) United States Patent
Diament et al.

(10) Patent No.: US 9,886,086 B2
(45) Date of Patent: Feb. 6, 2018

(54) GESTURE-BASED REORIENTATION AND NAVIGATION OF A VIRTUAL REALITY (VR) INTERFACE

(71) Applicant: Verizon Patent and Licensing Inc., Arlington, VA (US)

(72) Inventors: Layton R. Diament, San Francisco, CA (US); Mohammad Raheel Khalid, Budd Lake, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 14/843,362

(22) Filed: Sep. 2, 2015

(65) Prior Publication Data

US 2017/0053443 A1 Feb. 23, 2017

Related U.S. Application Data

(60) Provisional application No. 62/208,272, filed on Aug. 21, 2015.

(51) Int. Cl.

| | |
|---|---|
| *G06T 19/00* | (2011.01) |
| *G06F 3/044* | (2006.01) |
| *G06F 3/01* | (2006.01) |
| *G06F 1/16* | (2006.01) |
| *G06F 3/039* | (2013.01) |
| *G06F 3/0488* | (2013.01) |
| *G06F 3/0354* | (2013.01) |

(52) U.S. Cl.
CPC ............ *G06F 3/012* (2013.01); *G06F 1/1643* (2013.01); *G06F 3/039* (2013.01); *G06F 3/03547* (2013.01); *G06F 3/044* (2013.01); *G06F 3/04883* (2013.01); *G06T 19/003* (2013.01)

(58) Field of Classification Search
CPC ....... G06T 19/006; G06F 3/044; G06F 3/017; G06F 3/012; G06F 3/0482
See application file for complete search history.

(56) References Cited

U.S. PATENT DOCUMENTS

| | | | | |
|---|---|---|---|---|
| 6,771,276 | B1* | 8/2004 | Highsmith | ............. G06T 15/20 345/419 |
| 9,096,920 | B1* | 8/2015 | Gomez | ..................... C23C 4/06 |
| 2002/0015064 | A1* | 2/2002 | Robotham | ............ G06F 3/0481 715/863 |
| 2003/0103043 | A1* | 6/2003 | Mulligan | ................. G06F 3/044 345/174 |

(Continued)

*Primary Examiner* — Tapas Mazumder

(57) ABSTRACT

A virtual reality (VR) device presents a virtual environment and detects an input that relates to a contact by a user. The VR device identifies attributes of the input, and the attributes include, for example, a portion of the VR device associated with the contact, a duration of the contact, and a direction of motion of the contact. The VR device modifies the presented virtual environment based on the input attributes, such as presenting a default view of the virtual environment when a first type of input is detected; moving a virtual horizon when a second type of input is detected; enlarging a depicted virtual object when a third type of input is detected; presenting a menu of options when a fourth type of input is detected; and capturing and presenting an image or video of the user's actual surroundings when a fifth type of input is detected.

20 Claims, 24 Drawing Sheets

(56) References Cited

U.S. PATENT DOCUMENTS

| | | | | |
|---|---|---|---|---|
| 2005/0285879 A1* | 12/2005 | Suzuki | G06T 19/006 | 345/633 |
| 2009/0256947 A1* | 10/2009 | Ciurea | G06F 3/0488 | 348/333.12 |
| 2011/0245670 A1* | 10/2011 | Tashiro | G01S 7/52084 | 600/443 |
| 2012/0050324 A1* | 3/2012 | Jeong | G06F 17/30 | 345/633 |
| 2012/0140070 A1* | 6/2012 | De Mers | G02B 27/017 | 348/144 |
| 2012/0278185 A1* | 11/2012 | Ramachandran | G06Q 30/02 | 705/14.73 |
| 2013/0300674 A1* | 11/2013 | Davidson | G06F 3/04883 | 345/173 |
| 2013/0339907 A1* | 12/2013 | Matas | G06T 11/60 | 715/853 |
| 2015/0169176 A1* | 6/2015 | Cohen | G06F 3/04842 | 715/852 |
| 2015/0241968 A1* | 8/2015 | Brehmer | G06F 1/163 | 345/156 |
| 2016/0004322 A1* | 1/2016 | Takada | G06F 3/013 | 345/173 |
| 2016/0191803 A1* | 6/2016 | Lee | H04N 5/23293 | 348/207.1 |

* cited by examiner

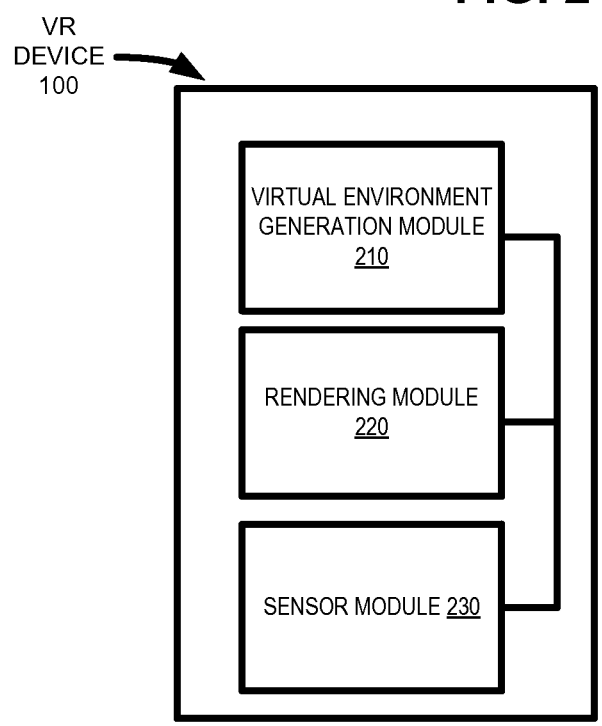

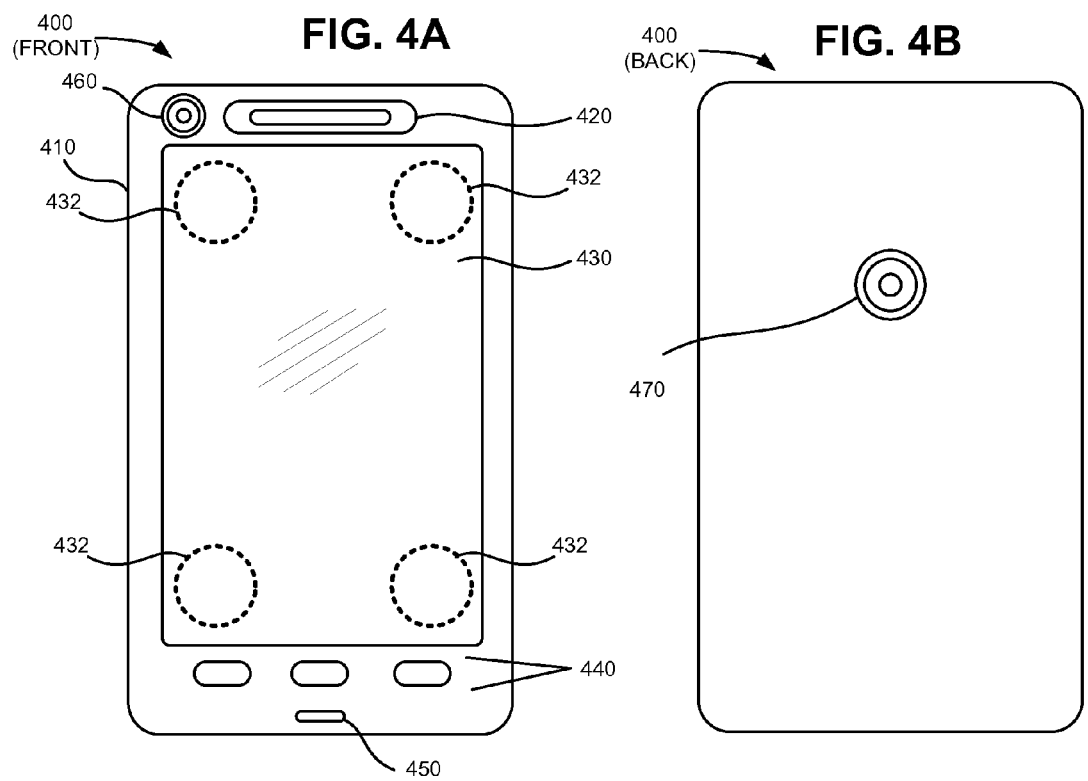

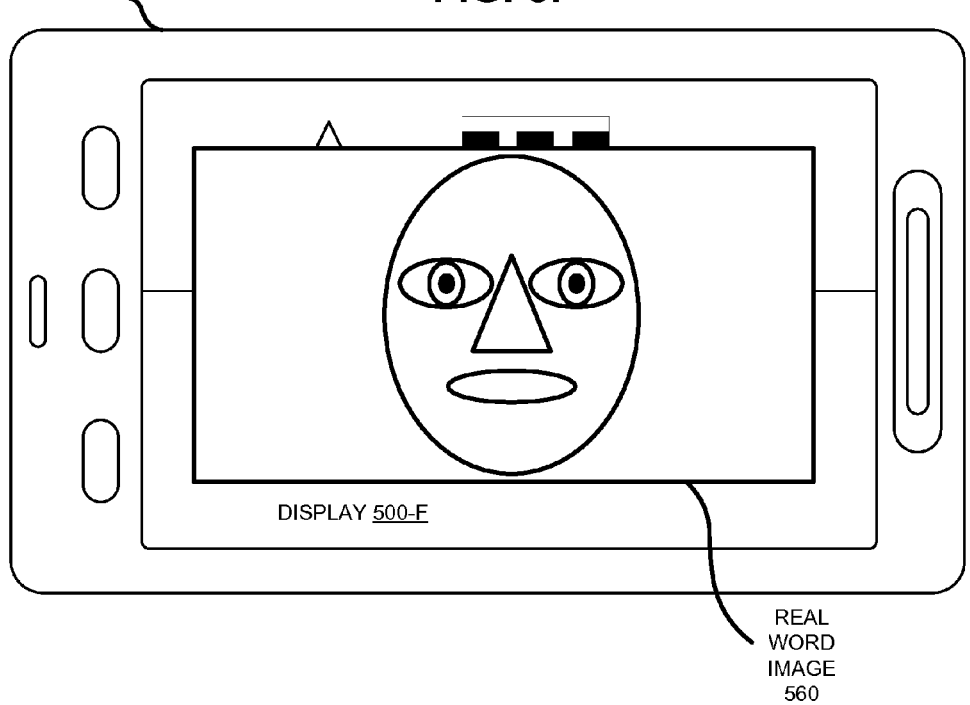

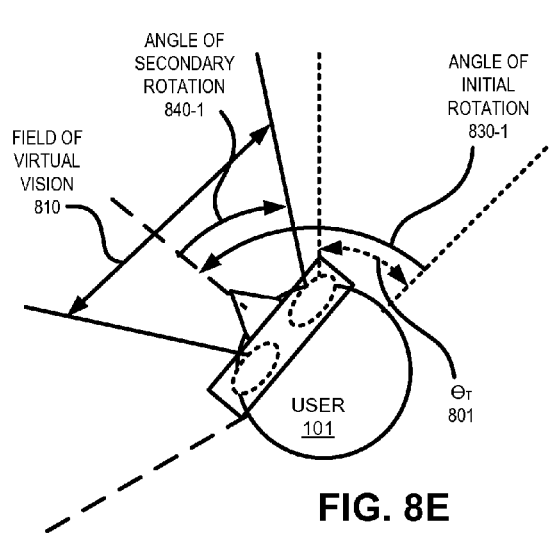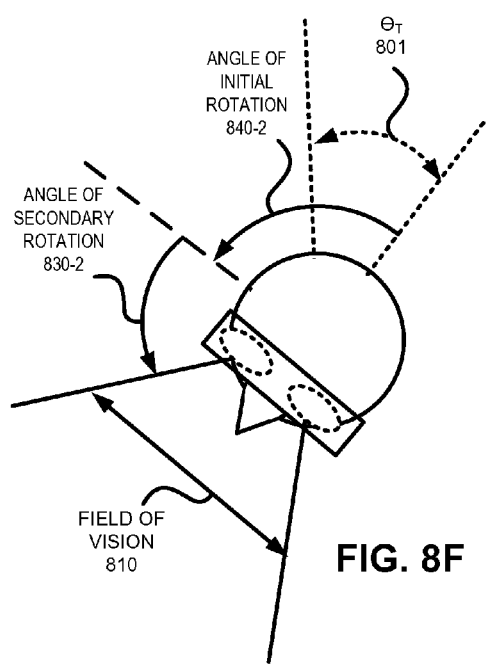
FIG. 8E
FIG. 8F

US 9,886,086 B2

GESTURE-BASED REORIENTATION AND NAVIGATION OF A VIRTUAL REALITY (VR) INTERFACE

RELATED APPLICATION

This application claims priority under 35 U.S.C. § 119 based on U.S. Provisional Patent Application No. 62/208,272, filed Aug. 21, 2015, the disclosure of which is hereby incorporated herein by reference.

BACKGROUND

Virtual Reality (VR), which can be referred to as immersive multimedia or computer-simulated life, replicates an environment that simulates physical presence in places in the real world or imagined worlds and lets the user interact in that world. VR systems may simulate an environment by modeling the environment and presenting the modeled environment that allows aspects of the environment to be perceived (i.e., sensed) by the user. A VR system may, for example, simulate the appearance of the simulated environment by displaying associated stereoscopic images, simulate the sounds of the simulated environment by playing associated audio, simulate the smells of the simulated environment by releasing chemicals to cause certain odors, and/or simulate the feel of the simulated environment by using haptic (or other tactile feedback) technology to selectively apply certain forces to the user.

BRIEF DESCRIPTION OF THE DRAWINGS

FIG. 2 shows exemplary functional modules that may be included in a VR device shown in FIGS. 1A-1F;

FIGS. 4A and 4B show exemplary components of a communications device that may be included in the VR device shown in FIGS. 1A-1F and FIG. 2;

FIG. 5A-5F show exemplary displays that may be presented via the VR device shown in FIGS. 1A-1F and FIG. 2;

FIGS. 8A-8F show an example of using the VR device shown in FIGS. 1A-1F and FIG. 2 to selectively provide a user interface (UI)

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1A:
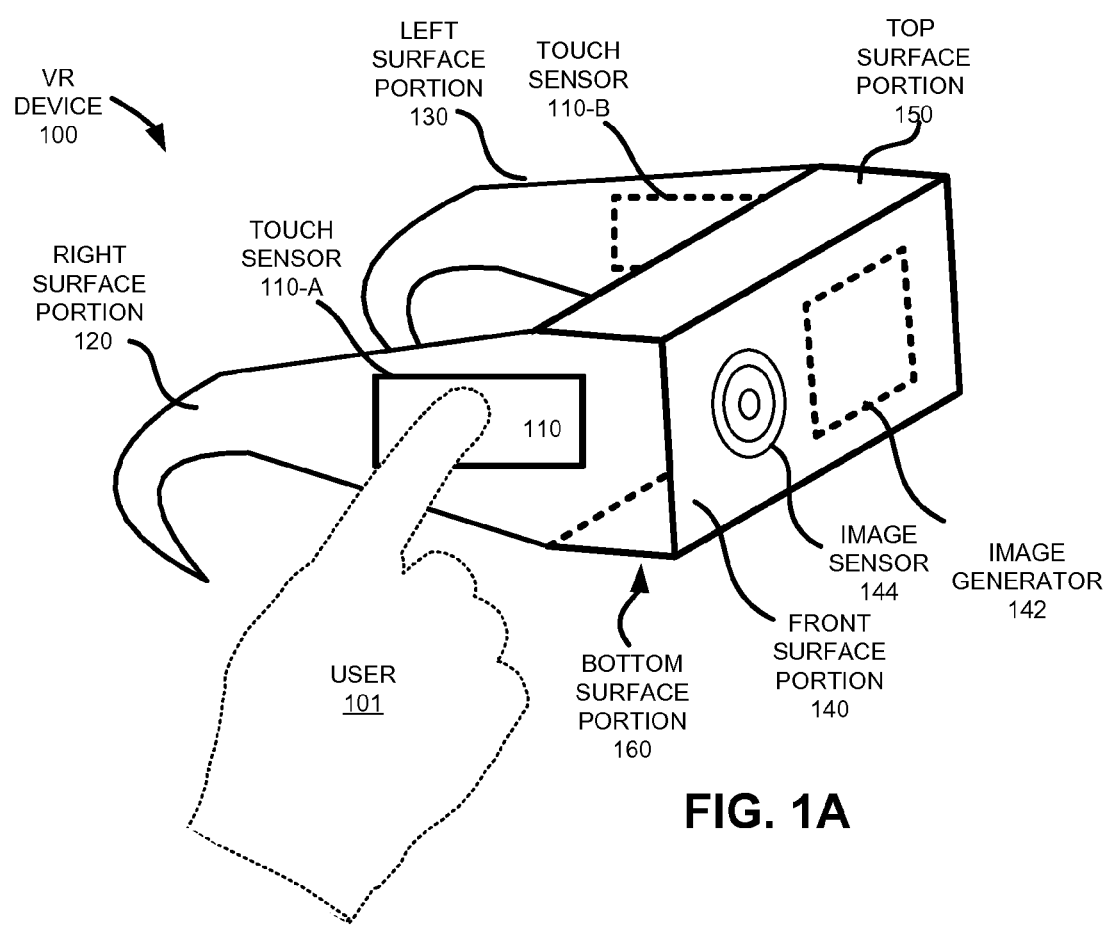
FIGS. 1A-1F show exemplary components that may be included in a Virtual Reality (VR) device.

FIG. 1A is an exemplary virtual reality (VR) device 100 in accordance with one implementation. VR device 100 may be worn on the face of a user 101 so that VR device 100 provides visual stimulus to the eyes of user 101 in order to display an artificial environment. As shown in FIG. 1A, VR device 100 may include, for example, one or more touch sensors 110 (shown in FIG. 1A as touch sensor 110-A and touch sensor 110-B), a right surface portion 120, a left surface portion 130, a front surface portion 140, a top surface portion 150, and a bottom surface portion 160. As used herein, the terms "right," "left," "top," "bottom," and "front" are intended to describe directions relative to user 101's eyes.

In the example shown in FIG. 1A, touch sensors 110 are located on right surface portion 120 and/or left surface portion 130 so that user 101 may contact one or more of touch sensors 110 to provide an input to modify the displayed virtual environment or otherwise control the operation of VR device 100. Touch sensor 110 may include, for example, a resistive layer, a capacitive layer, or other structure for detecting a contact by and/or proximity of user 101 (or a pointing apparatus (e.g., a stylus) held by user 101) to touch sensor 110. Touch sensor 110 may further detect attributes of the contact and/or movement by user 101. For example, touch sensor 110 may detect attributes of a detected contact, such as a position of the contact, a direction of movement associated with the contact, a duration of the contact, which parts of the user 101 contacting touch sensor 110 (e.g., whether user 101 contact touch sensor 110 with a single finger or two fingers), etc. Furthermore, VR device 100 may detect if user 101 contacts multiple touch sensors 110 at substantially the same time (e.g., during the same second of time or other time interval) and may determine different attributes (e.g., direction, duration, contact point, etc.) associated with each of the detected contacts. As described in greater detail below, user 101 may control aspects of the operation of VR device 100 based on the attributes of the one or more user contact(s) detected by touch sensors 110.

Figure 1B:
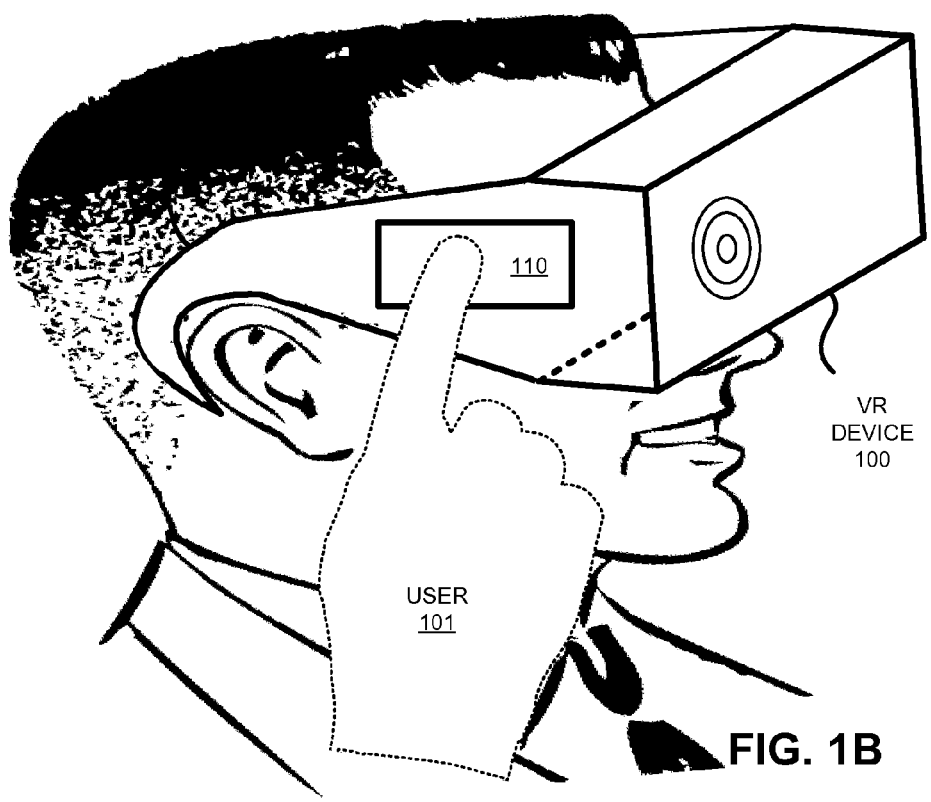

Right surface portion 120 and left surface portion 130 may be shaped or otherwise adapted to position VR device 100 to be worn by user 101. For example, as shown in FIG. 1B, right surface portion 120 and/or left surface portion 130 may be shaped and positioned to engage the ears of user 101 and to position VR device 100 over the eyes of user 101. Additionally or alternatively, right surface portion 120 and/or left surface portion 130 may include a strap or other attachment mechanism to position VR device 100 on the user 101's head.

As shown in FIG. 1A, front surface portion 140 may include an image generator 142. Image generator 142 may generate content associated with a virtual environment that is presented to user 101 (e.g., toward the eyes if user 101). For example, image generator 142 may include a display device that includes a light source, such as a light emitting diode, and filtering layer, such as a liquid crystal layer, to modify emissions from the light source to render stereoscopic images of the virtual environment. Additionally or alternatively, image generator 142 may include optical components, such as a lens, a filter, a waveguide, polarizer, etc., that modifies an optical characteristic of the rendered content when VR device 100 is worn by user 101.

It should be appreciated that VR device 100 may include additional and/or different other output devices to provide a virtual environment to user 101. For example, VR device 100 may include a speaker to present audio content to user 101. In another example, VR device 100 may include a vibration motor or other haptic device to provide tactile feedback related to the virtual environment.

Front surface portion 140 may further include an image sensor 144. Image sensor 144 may include a camera to collect optical information. For example, image sensor 144 may collect information regarding ambient light conditions around user 101. Image generator 142 may modify its output based on the detected ambient light conditions. For example, image generator 142 may provide a brighter display when brighter (e.g., higher intensity) ambient light conditions are detected and may present a dimmer display when dimmer (e.g., lower intensity) ambient light conditions are detected. By being positioned on front surface portion 140, image sensor 144 may collect optical information regarding what user 101 could view if user 101 were not wearing VR device 100. For example, optical information collected by image sensor 144 may be presented to user 101 by image generator 142 to allow user 101 to view user 101's actual surroundings, as if user 101 were not wearing VR device 100.

Additionally or alternatively, VR device 100 may further include one or more other sensor devices. For example, VR device 100 may include a microphone to detect ambient audio data associated with user 101. A microphone may also collect audio data related to dialog spoken by or to user 101. VR device 100 may further include a motion sensor, such as a gyroscope or an accelerometer, that detects a movement by user 101. In one example, VR device 100 may incorporate one or more detected attributes of user 101's surrounding environment. For example, image generate 142 may modify a displayed virtual environment to reflect a detected motion and/or to display a virtual representation of a detected object.

As shown in FIG. 1A, VR device 100 may include top surface portion 150 and/or bottom surface portion 160. Top surface portion 150 and/or bottom surface portion 160 may function to properly position front surface portion 140 relative to user 101. For example, top surface portion 150 and/or bottom surface portion 160 may space image generator 142 at a proper distance to deliver a virtual environment in clear focus. Top surface portion 150 and/or bottom surface portion 160 may further conform to the shape of user 101's face to diminish or eliminate ambient light from being received or seen by user 101. By minimizing ambient light leakage, top surface portion 150 and/or bottom surface portion 160 may reduce user 101's perception of the actual surroundings and allow user 101 to better focus on the virtual environment provided by image generator 142.

As shown in FIG. 1B, VR device 100 may be worn or otherwise positioned on a head of user 101. For example, VR device 100, when worn by user 101, may present images associated with an artificial environment and VR device 100 may receive an input from user 101 via a touch sensor 110.

Figure 1C:
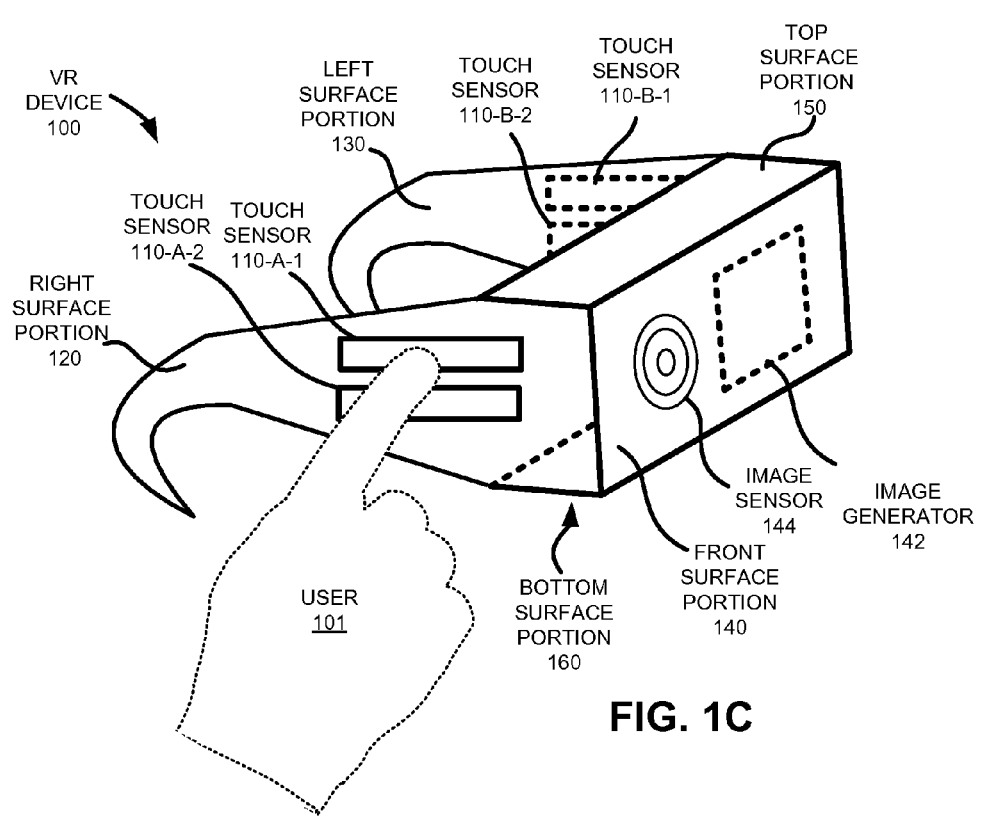

In an implementation shown in FIG. 1C, a portion (or surface) of VR device 100 may include two or more touch sensors 110. In the exemplary VR device 100 shown in FIG. 1C, two touch sensors 110-A-1 and 110-A-2 may be affixed to right surface portion 120, and two other touch sensors 110-B-1 and 110-B-2 may be affixed to left surface portion 130. By including multiple touch sensors 110 in a region or surface, VR device 100 may receive, for example, a user input that includes multiple concurrent contacts (e.g., user 101 simultaneously touches a portion of VR device 100 with two fingers). In another example, VR device 100 may receive another user input that includes user 101 moving a contact point (e.g., dragging a finger) across multiple touch sensors 110, so that VR device 100 may determine a direction, velocity, etc., of the movement.

Figure 1D:
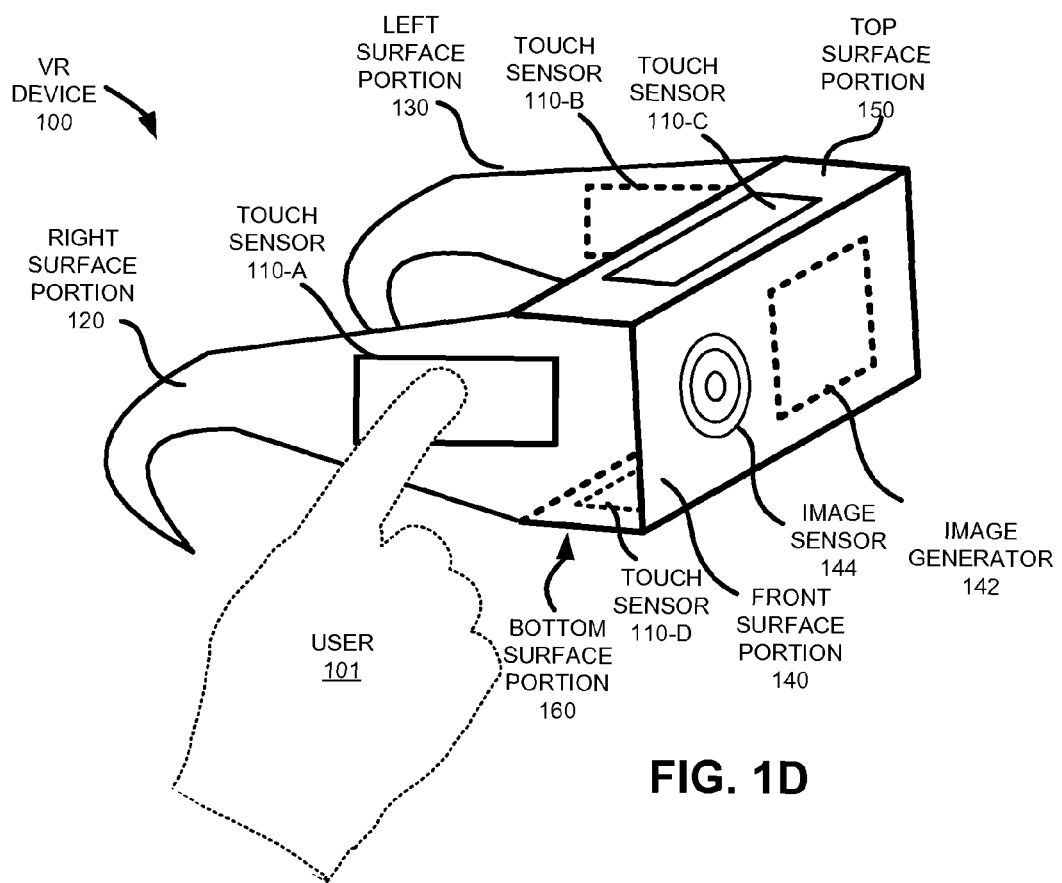

In another implementation shown in FIG. 1D, multiple portions (or surfaces) of VR device 100 may include touch sensors 110. In the exemplary VR device 100 shown in FIG. 1D, touch sensor 110-A is affixed to right surface portion 120, touch sensor 110-B is affixed to left surface portion 130, touch sensor 110-C is affixed to top surface portion 150, and touch sensor 110-D is affixed to bottom surface portion 160. By including touch sensors 110 on multiple regions or surfaces, VR device 100 may receive, for example, a user input that includes multiple concurrent contacts (e.g., user 101 simultaneously touches different portions of VR device 100). In another example, VR device 100 may receive a user input that includes user 101 moving a contact point (e.g., dragging a finger) across multiple portions of VR device 100, so that VR device 100 may determine a direction, velocity, movement pattern, etc., of the contact.

Figure 1E:
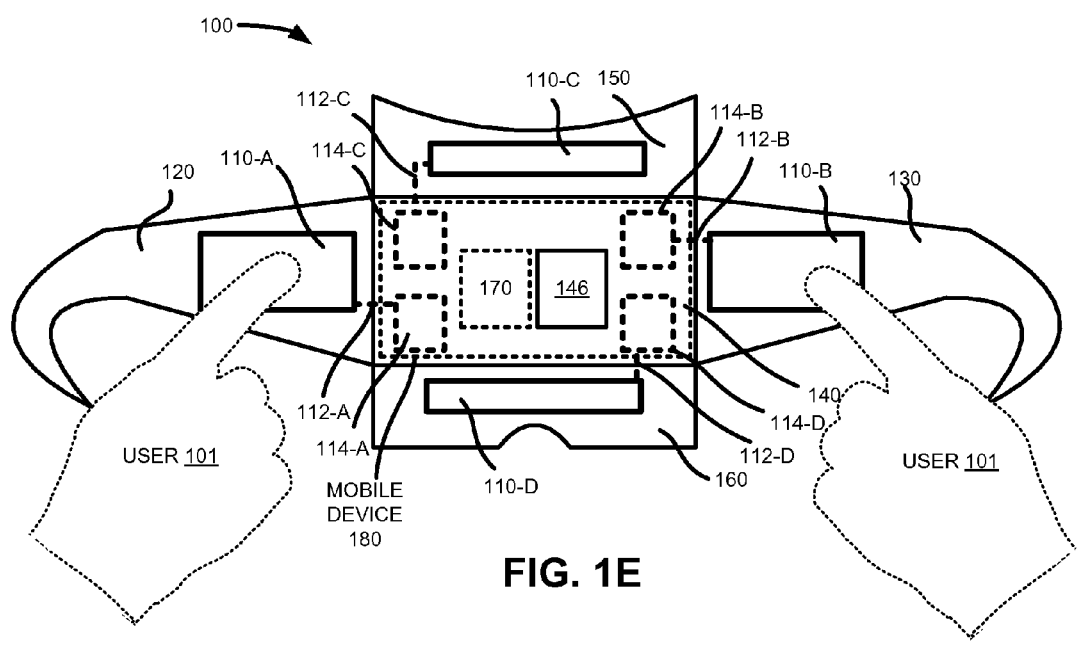
Figure 1F:
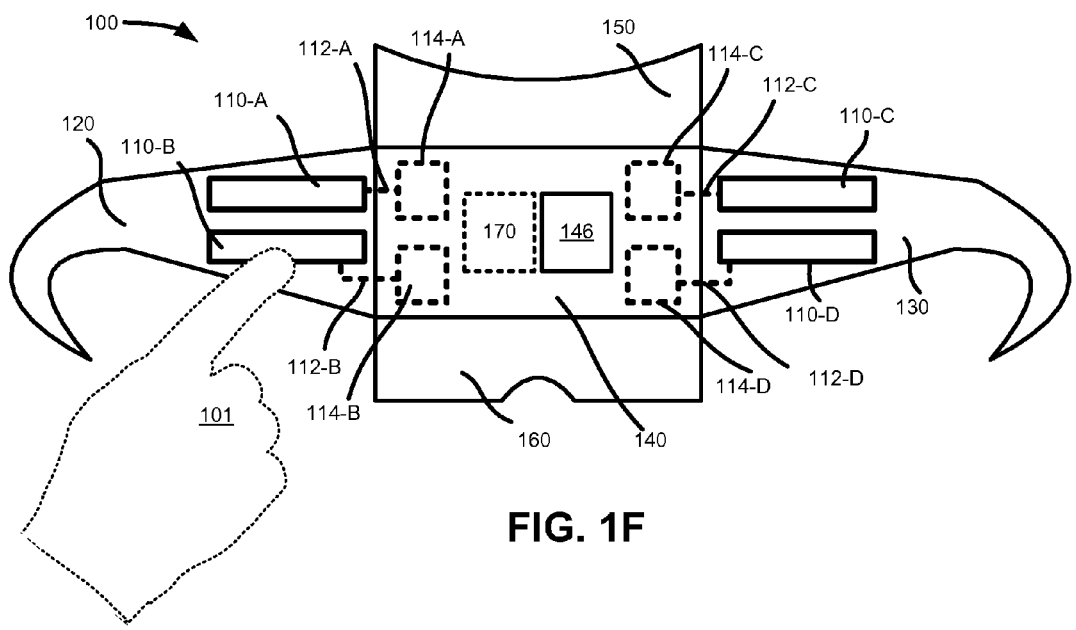

In another implementation shown in FIGS. 1E and 1F, VR device 100 may include an attachment mechanism 170, such as clasp, screw, bolt, pocket, etc., that receives and holds a mobile device 180, such as a cellular telephone, a personal communications system (PCS) terminal (e.g., that may combine a cellular telephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, a wearable computer (e.g., a smart watch), or another type of mobile computation and/or communication device. In this implementation, one or more components of mobile device 180 may function as image generator 142, image sensor 144, or other component of VR device 100 described above with respect to FIGS. 1A-1D. For example, mobile device 180 may execute a program to display image content related to a virtual environment, and attachment mechanism 170 may position mobile device 180 so that displayed content is directed toward user 101. Mobile device 180 may further include a camera or other component to function as image sensor 144 to capture image data related to an actual environment near user 101. As shown in FIGS. 1E and 1F, front surface 140 may include an opening 146 that enables the camera on mobile device 180 to capture image data through front surface 140 (e.g., in a direction that user 101 would be viewing if user 101 was not wearing VR device 100).

As shown in FIGS. 1E and 1F, VR device 100 may include a substantially planar structure that is foldable to be coupled to mobile device 180. For example, VR device 100 may be foldable to create, as attachment mechanism 170, a pocket or other structure for receiving mobile device 180. For example, VR device 100 may include a cardboard, paper, plastic, fabric, or other bendable material. When mobile device 180 is inserted into a folded VR device 100 and VR device 100 is worn by user 101, mobile device 180 may be positioned to display a virtual environment to user 101.

In one implementation, VR device 100 may interact with mobile device 180 to enable mobile device 180 to detect a contact by and/or proximity of user 101 to touch sensors 110. For example, as shown in FIGS. 1E and 1F, VR device 100 may include one or more leads 112 that electronically couple touch sensors 110 to contact areas 114. Contact areas 114 may be positioned near contact sensors included in mobile device 180. For example, mobile device 180 may include a capacitive touch screen (e.g., included in a display), and contact areas 114 may be positioned to transfer, via leads 112, capacitance from the touch screen in mobile device 180 to touch sensors 110. Touch sensors 110 in VR device 100 may include a planar metallic structure (e.g., capacitive tape) to receive and store capacitance from the mobile device 180. When user 101 contacts and/or moves near touch sensor 110, a capacitance of touch sensor 110 may be modified, and this capacitance change may be communicated or otherwise provided via leads 112 to a corresponding contact areas 114. The change of capacitance in contact areas 114 may be detected by mobile device 180 (e.g., as a change in capacitance in the region of a touch screen included in mobile device 180).

In the specific example shown in FIG. 1E, touch sensor 110-A is affixed to right surface portion 120, touch sensor 110-B is affixed to left surface portion 130, touch sensor 110-C is affixed to top surface portion 150, and touch sensor 110-D is affixed to bottom surface portion 160. In another example shown in FIG. 1F, touch sensors 110-A and 110-B are affixed to right surface portion 120, and touch sensors 110-C and 110-D are affixed to left surface portion 130.

Touch sensors 110-A, 110-B, 110-C, and 110-D may be connected via leads 112-A, 112-B, 112-C, and 112-D to contact areas 114-A, 114-B, 114-C, and 114-D. Contact areas 114-A, 114-B, 114-C, and 114-D may be positioned near different portions of a touch screen in mobile device 180. For example, contact areas 114-A, 114-B, 114-C, and 114-D may be positioned near corners of the touch screen. In this way, if user 101 contacts one of touch sensors 110, capacitive changes associated with this contact may be transferred or communicated via lead 112 and contact area 114 to be detected by a corresponding region (e.g., corner area) of the touch screen.

In another example, touch sensor 110 may include a mechanism, such as a capacitive or resistive circuitry, to detect attributes of a contact by or proximity of user 101 or an associated pointer device. Touch sensor 110 may further include a wireless transmission module to forward data regarding the detected user activity to mobile device 180. For example, touch sensor 110 may communicate to mobile device 180 using a wireless communications standard, such as Bluetooth® or WiFi®.

FIG. 2 is a schematic diagram illustrating exemplary components of VR device 100 according to one implementation. As shown in FIG. 2, VR device 100 includes a virtual environment generation module 210, a rendering module 220, and a sensor module 230.

Virtual environment generation module 210 may maintain a model of a virtual environment and may identify, based on the model, changes to the virtual environment that may occur based on the motions or other actions by user 101 (or detected attributes of a surrounding environment. Virtual environment generation module 210 maintains the model of the virtual environment and causes rendering module 220 to render the representation of the virtual environment in response to sensing changes in the user 101's perspective (e.g., changes in perspective resulting from user 101's interaction with the virtual environment). Virtual environment generation module 210 may determine changes to the virtual environment based on, for example, user 101's movement and/or change in user 101's head orientation. Virtual environment generation module 210 may also determine other sensory changes (e.g., changes in sound, feel, smell, or taste) associated with user 101's interactions with the virtual environment (e.g., movements by user 101).

Rendering module 220 may present the rendered representation of the virtual environment to allow user 101 to perceive the rendered aspects of the virtual environment. For example, rendering module 220 may provide stereoscopic images and/or video to user 101 (e.g., to the user's left and right eyes) to display a visual component of the virtual environment. Rendering module 220 may also include components adapted to provide an audible component of the virtual environment to user 101 (e.g., via headphones, ear pieces, speakers, etc.), and/or components capable of converting a tactile component of the virtual environment into forces perceptible to user 101 (e.g., via a haptic interface device). Rendering module 220 may also control external components configured to display images (e.g., a display device), play sounds (e.g., a speaker), and/or apply forces (e.g., a haptic interface).

Sensor module 230 determines a position of an object in a reference environment and generates reference positioning data representing the object's position in the reference environment. The object may be a person (e.g., user 101), a part of a person (e.g., a body part of user 101), or other object. The type of object tracked by sensor module 230 may depend on the nature of the virtual environment and/or the intended application of the virtual environment. In some embodiments, sensor module 230 may include a component to receive geographic position data (e.g., a global positioning system (GPS) receiver), a motion capture system (e.g., a system that uses cameras and/or infrared emitters to determine an object's position), an inertial motion module (e.g., a module that includes one or more accelerometers, gyroscopes, and/or magnetometers to determine an object's position), an ultrasonic system, an electromagnetic system, and/or any other positioning system suitable for determining a position of an object.

Virtual environment generation module 210 may process the reference positioning data to determine a position of the object in the virtual environment. For example, if the reference positioning data includes the position of user 101, virtual environment generation module 210 may determine user 101's position in the virtual environment ("virtual position") and use the virtual position to determine at least some aspects of the rendered representation of the virtual environment. For example, virtual environment generation module 210 may use the virtual position to determine sights, sounds, and/or tactile sensations to render (by rendering module 220) information that correspond to user 101's current relationship with the virtual environment. For example, virtual environment generation module 210 may use the virtual position to render a virtual character (e.g., an avatar) corresponding to user 101 at the virtual position.

Sensor module 230 may further determine an orientation of an object in a reference environment and generate orientation data representing the object's orientation in the reference environment. The object may be a person (e.g., user 101), a part of a person (e.g., a body part of a user 101, such as a head), or any other suitable object. For example, sensor module 230 may determine the orientation of a user 101's head to determine which direction user 101 is facing so rendering module 220 correctly renders the virtual environment from the perspective of user. For example, sensor module 230 may include an accelerometer, a gyroscope, and/or any other sensor attached to a real object and configured to determine an orientation of the real object in the reference environment. Some embodiments of sensor module 230 may include a motion capture system (e.g., a camera-based system) configured to determine an object's orientation in a monitored space, an inertial motion module configured to determine an object's orientation in a virtual coordinate system, an eye-tracking system configured to determine an orientation of a user 101's eye(s), and/or any other apparatus configured to determine an orientation of an object in a reference environment.

Virtual environment generation module 210 may process the reference orientation data to determine an orientation of a virtual object in the virtual environment. If the reference orientation data includes the orientation of a user 101, virtual environment generation module 210 may determine the orientation in the virtual environment ("virtual orientation") of a character corresponding to user 101 (e.g., an avatar or other suitable representation of user) and process the character's virtual orientation to determine at least some aspects of the rendered representation of the virtual environment. For example, virtual environment generation module 210 may use the character's virtual orientation to determine sights, sounds, and/or tactile sensations to render to user 101 to simulate a desired environment. In some embodiments, virtual environment generation module 210 may use the character's virtual orientation to render a representation of the character (e.g., an avatar) having a virtual orientation in the virtual environment based, at least in part, on a reference orientation associated with user 101.

FIGS. 1A-1F and 2 depict exemplary components of VR device 100, in other implementations, VR device 100 may include fewer components, additional components, different components, or differently arranged components than illustrated in FIGS. 1A-1F and 2. Furthermore, one or more components of VR device 100 may perform one or more tasks described as being performed by one or more other components of VR device 100.

Figure 3:
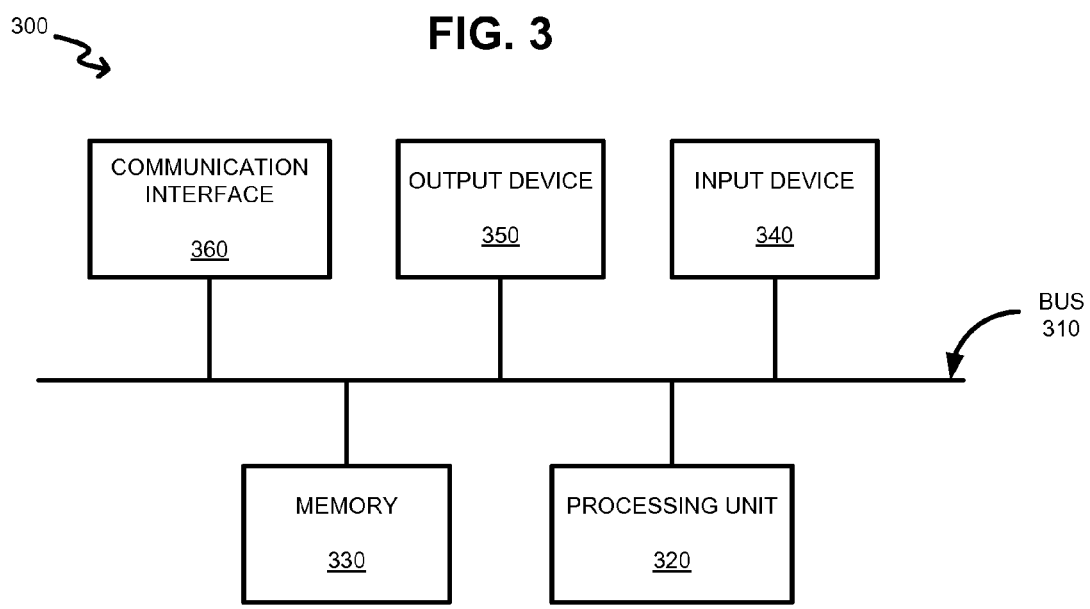
FIG. 3 shows a diagram of exemplary components that may be included in an computing device included in the VR device shown in FIGS. 1A-1F and FIG. 2.

FIG. 3 is a schematic diagram illustrating exemplary components of a computing device 300. VR device 100 and/or mobile device 180 may each include one or more computing devices 300. As shown in FIG. 3, computing device 300 may include a bus 310, a processing unit 320, a memory 330, an input device 340, and output device 350, and a communication interface 360.

Bus 310 may include a path that permits communication among the components of computing device 300. Processing unit 320 may include a processor, a microprocessor, or processing logic that may interpret and execute instructions. Memory 330 may include any type of dynamic storage device that may store information and instructions, for execution by processing unit 320, and/or any type of non-volatile storage device that may store information for use by processing unit 320. Input device 340 may include a mechanism that permits a user to input information to computing device 300, such as a keyboard, a keypad, a button, a switch, etc. Output device 350 may include a mechanism that outputs information to user, such as a display (e.g., a liquid crystal display, an LED-based display, etc.), a speaker, one or more light emitting diodes (LEDs), etc.

Communication interface 360 may include any transceiver that enables computing device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio-frequency (RF) signals. For example, communication interface 360 may include one or more antennas to transmit and/or receive RF signals over the air. Communication interface 360 may, for example, receive RF signals and transmit them over the air. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Computing device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Computing device 300 may include fewer components, additional components, different components, and/or differently arranged components than those illustrated in FIG. 3. Furthermore, one or more components of computing device 300 may perform one or more tasks described as being performed by one or more other components of computing device 300.

FIGS. 4A and 4B show a front side (e.g., in the direction of a displayed visual output) and a rear side (e.g., in a direction opposite of the displayed visual output) of an exemplary communications device 400 that may correspond to mobile device 180. As shown in FIGS. 4A and 4B, communications device 400 may include a housing 410, a speaker 420, a touch screen 430, control buttons 440, a microphone 450, a front camera element 460, and/or a rear camera element 470. Housing 410 may include a chassis via which some or all of the components of communications device 400 are mechanically secured and/or covered. Speaker 420 may include a component to receive input electrical signals from communications device 400 and transmit audio output signals, which communicate audible information to a user of communications device 400.

Touch screen 430 may include a component to receive input electrical signals and present a visual output in the form of text, images, videos and/or combinations of text, images, and/or videos which communicate visual information to user 101. In one implementation, mobile device 180 may execute a program that causes touch screen 430 to display a virtual environment when computer device 400 is inserted into VR device 100. In other examples, touch screen 430 may display text, images, and/or video received from another device, and/or information regarding incoming or outgoing calls or text messages, emails, media, games, phone books, address books, the current time, etc.

Touch screen 430 may also include a component to permit data and control commands to be inputted into communications device 400 via touch screen 430. For example, touch screen 430 may include a capacitive or field sensor to detect touch. As described above with respect to FIGS. 1E and 1F, touch screen 430 may be coupled to VR device 100 to detect a user input in touch sensors 110. For example, touch screen 430 may include one or more detection regions 432 that interface with touch sensors 110 via lead 112 and/or contact areas 114. When user 101 contacts touch sensor 110, a corresponding contact region 432 may detect the contact (e.g., capacitance at the detection region 432 may change based on the contact by user 101 to touch sensor 110).

In one implementation, detection regions 432 may be spaced apart on touch screen 430 so that changes in capacitance associated with a contact at one touch sensor 110 may be differentiated, by touch screen 430, from a contact at a different touch sensor 110. For example, as shown in FIG. 4A, contact areas 114 (not shown in FIG. 4A) may be positioned near corresponding detection regions 432 in corners of touch screen 430 (e.g., so that detection regions 430 are separated from each other by a maximum distance). Communications device 400 may be further programmed to associate locations of touch sensors 110 with different detection regions 432. In the example shown in FIG. 1E, touch sensor 110-A on right surface portion 120 may be coupled to contact area 114-A positioned near the lower right corner of touch screen 430, and touch sensor 110-B on left surface portion 130 may be coupled to contact area 114-C positioned near the upper left corner of touch screen 430. In this example, touch sensor 110-C on top surface portion 150 may be coupled to contact area 114-B positioned near the top right corner of touch screen 430, and touch sensor 110-D on bottom surface portion 140 may be coupled to contact area 114-D positioned near the lower left corner of touch screen 430.

Referring again to FIG. 4A, control buttons 440 of communications device 400 may include one or more buttons that accept, as input, mechanical pressure from user (e.g., user presses a control button or combinations of control buttons) and send electrical signals to a processor (not shown) that may cause device 400 to perform one or more operations. For example, control buttons 440 may be used to cause communications device 400 to transmit information. Microphone 450 may include a component to receive audible information from user and send, as output, an electrical signal that may be stored by device 400, transmitted to another user device, or cause the device to perform one or more operations.

As shown in FIGS. 4A and 4B, front camera element 460 may be provided on a front side of communications device 400 and rear camera element 470 may be provided on a back side of communications device 400. Each of front camera element 460 and rear camera element 470 may include a component to receive, as input, analog optical signals and send, as output, a digital image or video that can be, for example, viewed on touch screen 430, stored in the memory of device 400, discarded and/or transmitted to another device 400. In one implementation, front camera element 460 may capture images about user 101 (e.g., monitor movement of user 101's eyes) when communications device 400 is inserted into VR device 100. Similarly, when communications device 400 is inserted into VR device 100, rear camera element 470 may capture images via opening 146 in front surface portion 140 when communications device 400 is inserted into VR device 100. For example, rear camera element 460 may capture images that correspond to what user 101 could view if not wearing VR device 100.

Although FIGS. 4A and 4B depict exemplary components of communications device 400, in other implementations, communications device 400 may include fewer components, additional components, different components, or differently arranged components than illustrated in FIGS. 4A and 4B. Furthermore, one or more components of communications device 400 may perform one or more tasks described as being performed by one or more other components of communications device 400.

Figure 5A:
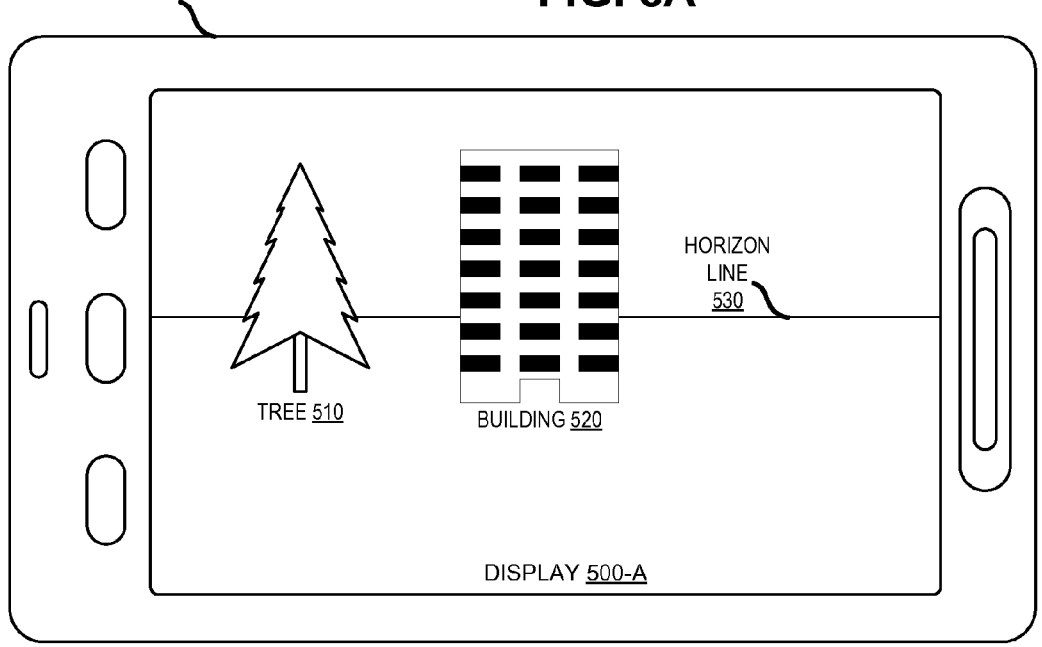

FIGS. 5A-5F show exemplary displays 500-A through 500-F that may be presented by VR device 100 (e.g., by touch screen 430 of mobile device 180 when inserted into VR device 100 and mobile device 180 is executing a program to generate and display a virtual environment) in various implementations in response to one or more inputs received from user 101 (e.g., contacts with one or more touch sensors 110). For example, FIG. 5A shows an exemplary display 500-A that presents a virtual environment that includes a tree 510 and a building 520 that are positioned near a horizon line 530 that is shown for reference (i.e., horizon line may or may not be presented to user 101 in displays 500-A). In the following discussion of FIGS. 5B-5G, display 500-A may represent a starting point in the virtual environment that is displayed by VR device 100 when initially activated (e.g., a "default view").

In one implementation, a single tap to touch sensor 110 by user 101 may cause VR device 100 to present display 500-A or another default view. For example, VR device 100 may determine that a tap has occurred when user 101 contacts (or moves a finger or other selection device (e.g., a pointer) in proximity to) touch sensor 110 for less than a threshold duration of time. Additionally or alternatively, VR device 100 may determine that a tap has occurred when another sensor in VR device 100, such as an accelerometer or vibration sensor, detects vibrations or another indication that user 101 has made a quick contact with touch sensor 110 or another portion of VR device 100.

When VR device 100 detects a tapping gesture by user 101, VR device 100 may reset user interface (UI) for user 101 inside of a virtual environment and present display 500-A. For example, if user 101 has a field of view obscured by a UI element (such as an information panel or drop down menu), user 101 may tap VR device 100 to reset the displayed UI to cause VR device 100 to reset the UI layout. The reset UI layout (e.g., as shown in FIG. 5A) may correspond to what user 101 saw when VR device 100 was initially activated (e.g., a default view) to remove the obscuring UI element.

In another example, VR device 100 may reset a default orientation associated with the display 500-A of the virtual environment. For example, when VR device 100 is initially activated, user 101 may be oriented in an awkward or otherwise undesirable direction (e.g., looking downward). When VR device 100 detects a tap by user 101, VR device 100 may re-associate display 500-A of the virtual environment with a new orientation (e.g., the direction associated with user 101 when the tap is detected).

In yet another example, if VR device 100 detects two or more taps, VR device 100 may redefine a current view being presented in the virtual environment as a new starting point. For example, VR device 100 may identify and store virtual objects being presented when the double tap gesture is received, and VR device 100 may represent, as initial display 500-A, the virtual objects when VR device 100 detects another tap.

Figure 5B:
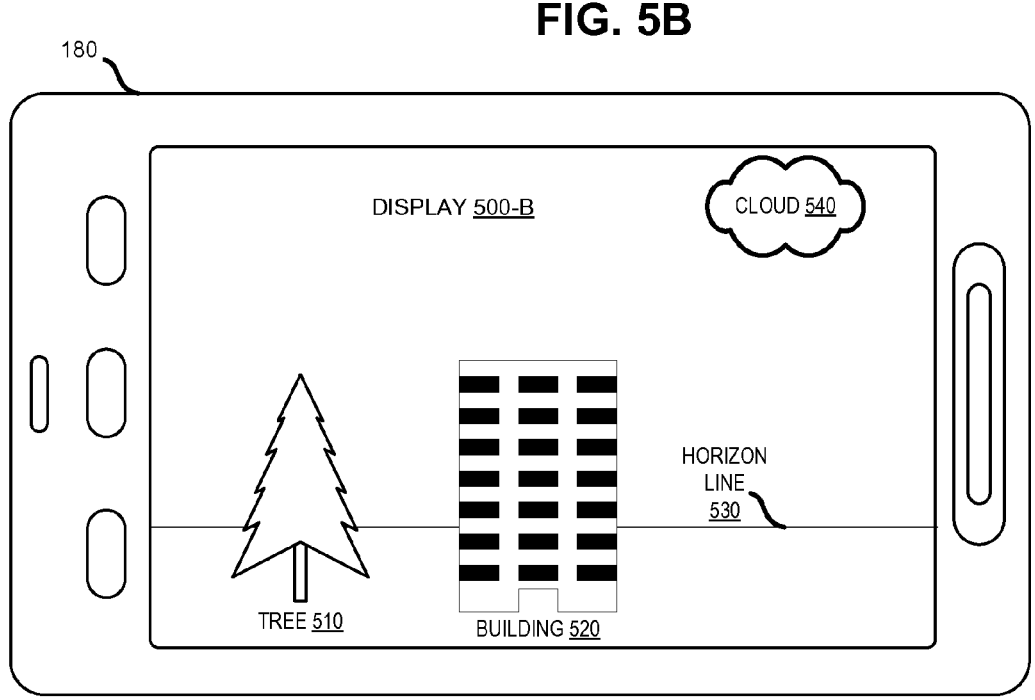

As shown in FIG. 5B, VR device 100 may present a display 500-B in which a horizon angle (e.g., move horizon line 530) may be raised or lowered. For example, VR device 100 may present display 500-B that includes a lowered horizon line 530 (e.g., to display one or more virtual objects, such as cloud 540, that are located above tree 510 and building 520) based on detecting substantially concurrent (e.g., during a same second) upward swiping motions by user 101 at both touch sensor 110-A and touch sensor 110-B. Similarly, if VR device 100 detects substantially concurrent downward swiping motions by user 101 at one or both touch sensor 110-A on right surface portion 120 and touch sensor 110-B on left surface portion 130, VR device 100 may present a modified display (not shown) that includes a raised horizon line 530 (e.g., to display one or more virtual objects that are located below tree 510 and building 520).

In another example, VR device 100 may present a display in which the displayed virtual objects move in a left direction based on detecting a forward swiping motion by user 101 at touch sensor 110-A on right surface portion 120 and/or a rearward swiping motion by user 101 at touch sensor 110-B on left surface portion 130. Similarly, VR device 100 may present a display in which the displayed virtual objects move in a right direction based on detecting a rearward swiping motion by user 101 at touch sensor 110-A on right surface portion 120 and/or a forward swiping motion by user 101 at touch sensor 110-B on left surface portion 130.

Figure 5C:
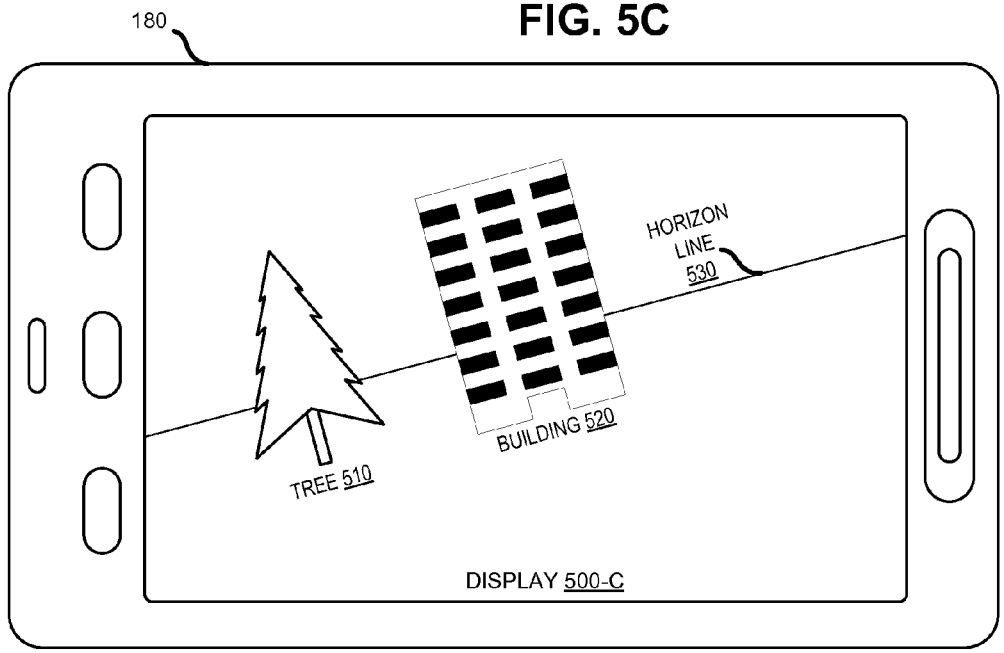

As shown in FIG. 5C, VR device 100 may present a display 500-C in which a horizon angle (e.g., horizon line 530) is rotated. For example, VR device 100 may present display 500-C in which horizon line 530 is rotated counter-clockwise based on detecting an upward swiping motion by user 101 at touch sensor 110-A on the right surface portion 120 and/or a downward swiping motion by user 101 at touch sensor 110-B on the left surface portion 130. Similarly, VR device 100 may present a display (not shown) in which horizon line 530 is rotated clockwise based on detecting a downward swiping motion by user 101 at touch sensor 110-A on right surface portion 120 and/or an upward swiping motion by user 101 at touch sensor 110-B on left surface portion 130.

Figure 5D:
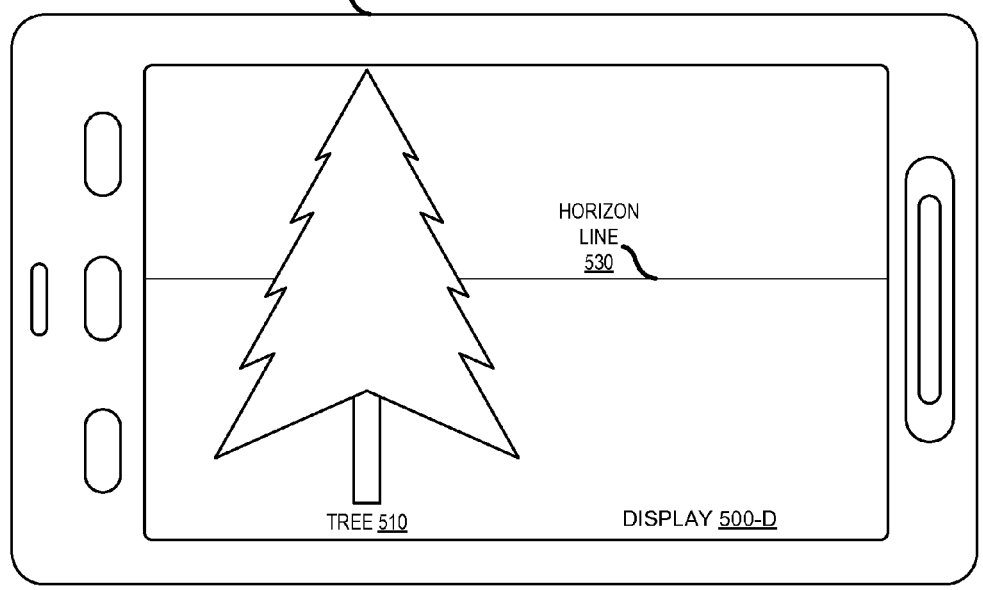

In another example shown in FIG. 5D, VR device 100 may present a display 500-D in which one or more virtual objects (e.g., tree 510) are resized. For example, VR device 100 may present display 500-D that enlarges (or reduces) a virtual object based on detecting a twisting motion by one or more hands of user 101 (e.g., a motion that corresponds to focusing a pairs of binoculars). For example, VR device 100 may enlarge a virtual object based on detecting a counter-clockwise rotation of user 101's right hand (e.g., an upward sliding motion at touch sensor 110-A on the right surface portion 120, a left-ward sliding motion at touch sensor 110-C on the top surface portion 150, and/or a right-ward sliding motion at touch sensor 110-D on the bottom surface portion 160) and/or a clockwise rotation of user 101's left hand (e.g., an upward sliding motion at touch sensor 110-B on the left surface portion 130, a right-ward sliding motion at touch sensor 110-C on the top surface portion 150, and/or a left-ward sliding motion at touch sensor 110-D on the bottom surface portion 160). In another example, VR device 100 may reduce the appearance of a virtual object based on detecting a clockwise rotation of user 101's right hand and/or a counter-clockwise rotation of user 101's left hand.

In another example, a binocular zooming gesture may also be used for simulating focus in stereoscopic displays to one or both eyes of user 101. In this case, a user interface (UI) such as a setup wizard, may calibrate differences in user 101's relative eye strength by providing a stereoscopic displays (e.g., separate displays to the left and eyes) that are adjusted for the differences. For example, a binocular zooming gesture may cause VR device 100 to create an artificial distortion filter that replicates an action of adjusting focal length associated with adjusting physical left or right eye lenses in VR device 100. The artificial focus adjustment may include, for example, user 101 first performing a two eye focus adjustment (e.g., hand rotation motions with both hands that is detected by one or more touch sensors 110) to bring both left and right stereoscopic displays to a common level of focus (e.g., a focus level that is appropriate for user 101's stronger eye), and then performing an additional one-handed adjustment (e.g., a hand rotation motion with a hand that is detected by one or more touch sensors 110) to provide additional adjustment for accommodate for eye-to-eye differences in focal strength of a weaker eye. In this way, a binocular zooming gesture may cause VR device 100 to mimic the focusing of a pair of binoculars that includes turning a focus screw at the top and then twisting a single eye's diopter component.

Figure 5E:
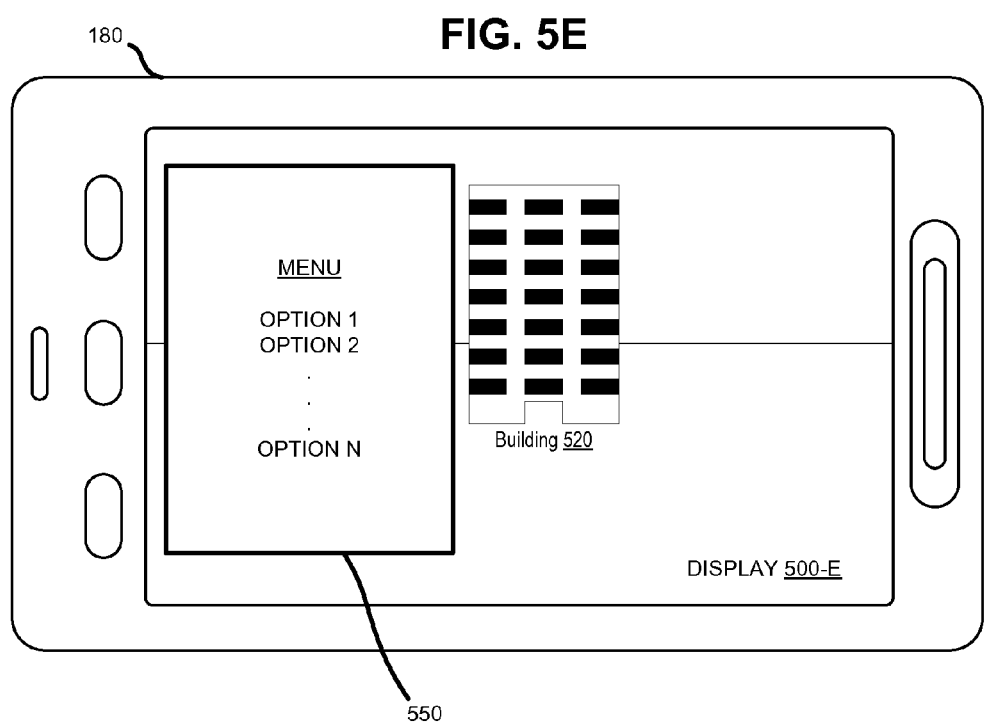

In an example shown in FIG. 5E, VR device 100 may present a display 500-E that includes a menu 550. For example, VR device 100 may present display 500-E based on detecting a swipe (e.g., a sideways motion) by user 101 at one or more touch sensors 110. As shown in FIG. 5E, menu 550 may include various options that may be selected by user 101, e.g., by contacting touch sensor 110, movement of user's 101 eyes as tracked by front image sensor 460, or using another input device. Options in menu 550 may identify, for example, different attributes of the displayed virtual environment, different multimedia content to be displayed by VR device 110, etc. As described above with respect to FIG. 5A, VR device 100 may remove menu 550 (e.g., present original display 500-A) based on detecting a tap (e.g., a contact that lasts less than a threshold duration) by user 101 at one or more touch sensors 110.

In an example shown in FIG. 5F, VR device 100 may present a display 500-F that includes a real world image 560. Real world image 560 may correspond to an image of user 101's physical surroundings (someone's face in this example). For example, real world image 560 may be captured by image sensor 144 and/or rear image sensor 470. In this way, real world image 560 may correspond to a peek of the real world to allow user 101 to view the real world without removing VR device 100 from his/her head. VR device 100 may present display 500-F based on a specific input by user 101, such as detecting a contact that lasts more than a threshold duration (e.g., more than 3 seconds) by user 101 at one or more touch sensors 110. VR device 100 may remove real world image 560 when the detected contact ends and/or based on detecting a tap (e.g., a contact that lasts less than a threshold duration) by user 101 at one or more touch sensors 110.

Although FIGS. 5A-5F depict exemplary displays 500-A through 500-F, in other implementations, displays 500-A through 500-F may include fewer graphical elements, additional graphical elements, different graphical elements, or differently arranged graphical elements than illustrated in FIGS. 5A-5F. Furthermore, displays 500-A through 500-F are described above as being presented by VR device 100 in response to detecting certain inputs, but it should be appreciated that displays 500-A through 500-F may be presented by VR device 100 in response to detecting different input and/or in other circumstance, including certain circumstance in which no input is detected.

Figure 6:
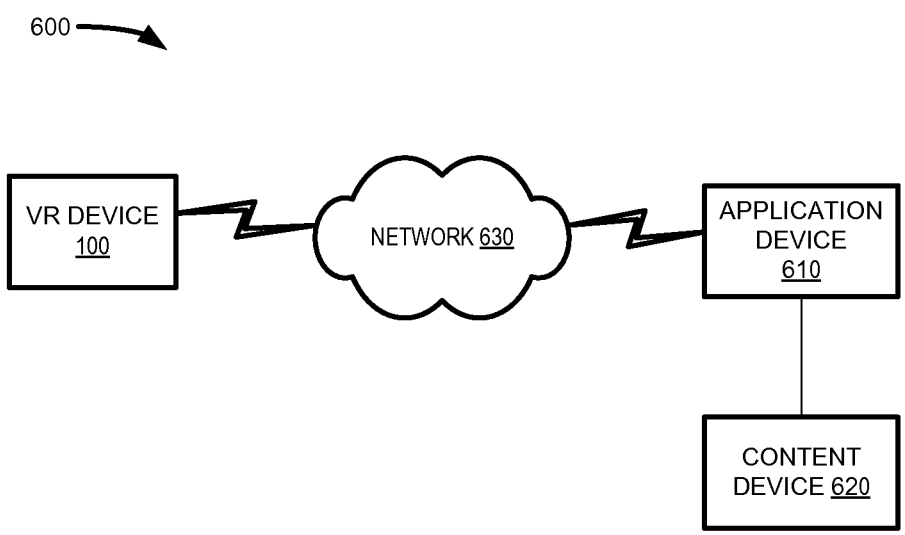
FIG. 6 shows an exemplary environment in which systems and/or methods described herein may be implemented.

FIG. 6 is a diagram of an exemplary environment 600 in which systems and/or methods described herein may be implemented. As shown in FIG. 6, environment 600 may include VR device 100, an application device 610, a content device 620, and a network 630.

Application device 610 may include a computing device that receives signals from VR device 100 identifying user inputs (e.g., contact by user 101 with one or more touch sensors 110 other input device) and/or sensor data collected by VR device 100. Application device 610 may forward and content to VR device 100 based on the user input. For example, application device 610 may forward stereoscopic display data associated with a virtual environment, multimedia content to be viewed in the virtual environment, a user interface, etc., based on the detected user input from VR device 110. VR device 100 may forward information identifying a detected motion (or other action) by user 101, and application device 610 may modify a presented virtual environment based on the detected motion. Application device 610 may obtain the content from content device 620. Content device 620 may include a single device or a group of devices (e.g., a content delivery network) that store content and selectively forward portions of the content to application device 610.

Network 630 may forward data between VR device 100 and application device 610. Network 630 may include a communications network, a data network, or a combination of networks that connect network elements 140. For example, network 630 may include local area networks (LANs), wireless local area networks (WLANs), VLANs, metropolitan area networks (MANs), wide area networks (WANs), virtual private networks (VPNs), intranets (including the Intranet), or an extranet. In another example, network 630 may include a radio network capable of supporting wireless communications to/from one or more devices in environment 600, and the radio network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 1000 (CDMA2000), High-Speed Packet Access (HSPA), Worldwide Interoperability for Microwave Access (WiMax), enhanced high-rate packet data (eHRPD), or a network implemented in accordance with other wireless network standards.

Although FIG. 6 depicts exemplary components of environment 600, in other implementations, environment 600 may include fewer components, additional components, different components, or differently arranged components than illustrated in FIG. 6. Furthermore, one or more components of environment 600 may perform one or more tasks described as being performed by one or more other components of environment 600.

Figure 7:
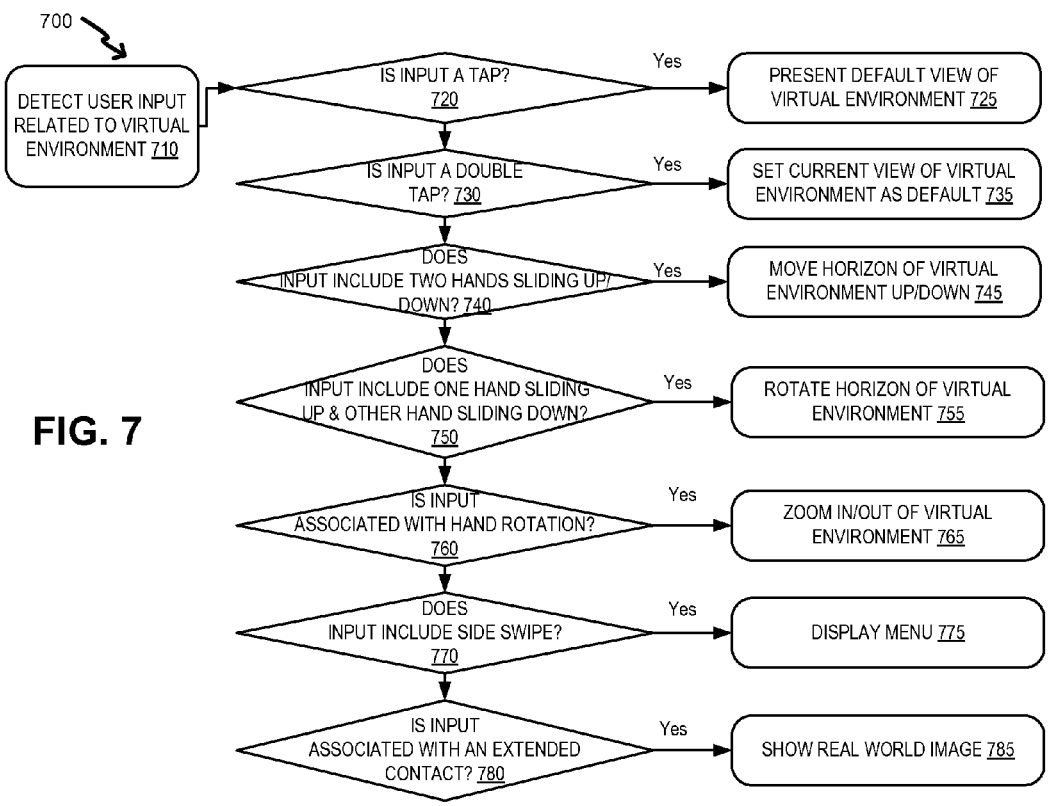
FIG. 7 shows a flow diagram illustrating an exemplary process for providing different displays in the VR device shown in FIGS. 1A-1F and FIG. 2 based on receiving different user inputs.

FIG. 7 is a flow diagram illustrating an exemplary process 700 for providing different displays in VR device 100 based on different user inputs. In one implementation, process 700 may be performed by VR device 100, including mobile device 180 when coupled to VR device 100. In other implementations, process 700 may be performed by one or more other devices of environment 600, such as application device 610 and/or content device 620.

As shown in FIG. 7, process 700 may include VR device 100 detecting a user input related to a virtual environment. For example, while VR device 100 is displaying or otherwise presenting the virtual environment to user 101, VR device 100 may determine whether user 101 contacts one of touch sensors 110 and, if so, identifies attributes associated with the contact (e.g., a portion of touch sensor 110 associated with the contact, a direction of the contact, a duration of the contact to touch sensor 110, etc.). For example, VR device 110 may be coupled to mobile device 180 that includes touch screen 430. In this example, capacitance from touch screen 430 may be transferred or communicated via leads 112 and contact areas 114 to touch sensors 110, and mobile device 180 may detect a change in capacitance when user 101 contacts touch sensors 110. Mobile device 180 may detect attributes of the contact (e.g., a direction of the contact, a duration of the contact, etc.) based on the capacitance change.

As shown in FIG. 7, process 700 may include determining whether the detected user input is a tap (block 720) or a double tap (block 730). For example, VR device 110 may determine that a tap has occurred when touch sensor 110 detects a contact by user 101 that lasts less than a threshold length of time. VR device 110 may determine that a double tap has occurred when touch sensor 110 detects two such contacts (e.g., that lasts less than the threshold length of time) by user 101. Additional or alternatively, VR device 100 (or mobile device 180 when inserted in to VR device 100) may include a motion sensor, such as an accelerometer or vibration sensor, that may detect vibrations associated with a tap.

If VR device 100 detects a tap (block 720—Yes), VR device 100 may present a default view of a virtual environment (e.g., display 500-A). For example, VR device 100 may present a portion of the virtual environment that is initially displayed by VR device 100 when initially activated/worn by user 101 (block 725). If VR device 100 detects a double tap gesture (block 730—Yes), VR device 100 may define a new default view of a virtual environment (block 735). For example, VR device 100 may determine virtual objects in the virtual environment being presented at the time the double taps are detected and may define a new default view that includes these virtual objects.

As shown in FIG. 7, process 700 may include VR device 100 determining whether the detected input includes user 101's hands moving vertically in the same direction at the same time (block 740) or whether the detected input includes user 101's hands moving in different vertical directions (block 750). For example, VR device 100 may determine whether one or more both of user 101's hands are contacting touch sensors 110, and if so, VR device 100 may determine the direction of motion associated with the detected contacts. For example, VR device 100 may determine whether one hand is sliding up at substantially the time that another hand is sliding down, or whether both hands are sliding the same direction. If both of user 101's hands are moving the same direction (block 740—Yes), VR device 100 may change the virtual horizon, such as causing the virtual environment presented by VR device 100 to move up or down (block 745) as shown in display 500-B in FIG. 5B. Otherwise, if user 101's hands are sliding in different directions, such as one hand sliding up and another hand is sliding down at substantially the time (block 750—Yes), VR device 100 may change an orientation of the virtual horizon, such as causing the virtual environment presented by VR device 100 to rotate (block 755), as shown in display 500-C in FIG. 5C.

As shown in FIG. 7, process 700 may also include VR device 100 determining whether the detected input includes a contact associated with a hand rotation (block 760) or whether the detected input includes a side swipe (block 770). For example, in block 760, VR device 100 may determine whether touch sensors 110 detect that one or more both of user 101's hands are moving in a manner consistent with a hand rotation (e.g., touch sensors 110 on right side portion 120 and/or left side portion 130 detect a vertical motion, and touch sensors 110 on top side portion 150 and/or bottom side portion 160 detect a concurrent sideways motion). If the detected input includes a contact associated with a hand rotation (block 760—Yes), VR device 100 may zoom in on (e.g., present an enlarged version of) a virtual object (block 765), as shown in display 500-D in FIG. 5D. If the detected input includes a side swipe (e.g., one of user 101's fingers slides across touch sensor 110) (block 770—Yes), VR device 100 may present a menu of options related to the presentation of the virtual environment (block 775), as shown in display 500-E in FIG. 5E.

As shown in FIG. 7, process 700 may further include VR device 100 determining whether the detected input is associated with an extended contact by user 101 (e.g., a contact that lasts at least a threshold amount of time) (block 780). For example, VR device 100 may determine whether one of touch sensors 110 detects contact by user 101 that lasts at least the threshold amount of time. If the detected input is associated with an extended contact by user 101 (block 780—Yes), VR device 100 may capture an image, video, or other sensor data associated with a real environment around user 101 and show the real world image (block 785), such as real world image 560 shown in display 500-F in FIG. 5F.

Figures 8A, 8B:
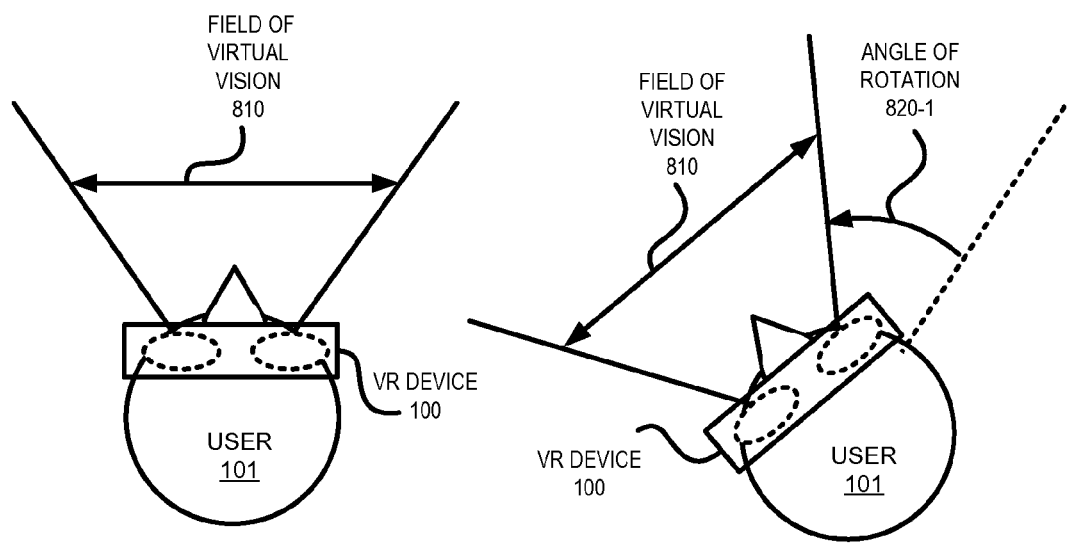

FIGS. 8A-8F show examples of using VR device 101 to selectively provide a user interface (UI) to user 101. For example, as shown in FIG. 8A, VR device 100, when worn by user 101, may present a virtual field of vision 810. When user 101 physically moves, virtual field of vision 810 may display an associated change in the displayed virtual environment. For example, as shown in FIG. 8B, user 101 may rotate (e.g., user 101 turns his/her head left or right) by an angle of rotation 820-1. A sensor included in or otherwise associated with VR device 100 (e.g., a accelerometer or gyroscope) may detect angle of rotation 820-1, and VR device 100 may adjust the displayed virtual environment, such as to move displayed virtual elements left/right based on angle of rotation 820-1.

Figures 8C, 8D:
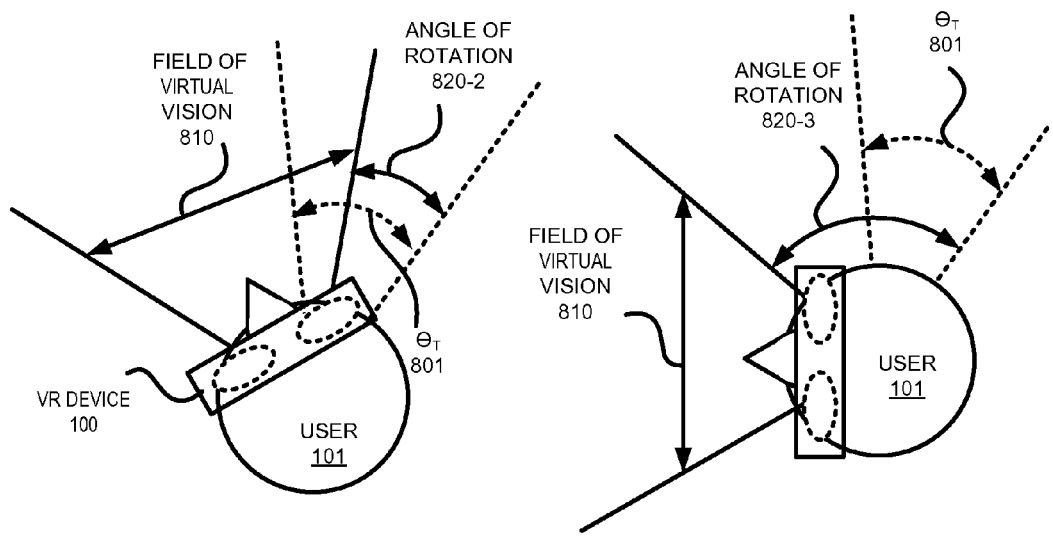

In one implementation, VR device 100 may selectively provide a UI, such as menu 550 (see FIG. 5E), based on angle of rotation 820-1, other attributes of a detected rotation (e.g., the rate/speed of the rotation, a change in the rotation versus a prior-detected rotation, the timing of the rotation (e.g., when the rotation occurred in comparison to a virtual event displayed in field of vision 810), and/or other detected motions by user 101 (e.g., inputs via one or more touch sensors 110, other head movements such as a sideways/forwards/backwards tilting, geographic movement of user 101, etc.). For example, as shown in FIG. 8C, VR device 100 may determine when angle of rotation 820-2 is less than a threshold angle $\theta_T$ 801. In one example, VR device 101 may not display a UI (e.g., menu 550) when angle of rotation 820-2 is less than threshold angle $\theta_T$ 801. In another example, example, VR device 100 may display only a portion of the UI when angle of rotation 820-2 is less than threshold angle $\theta_T$ 801. Similarly, as shown in FIG. 8D, VR device 100 may determine when angle of rotation 820-3 is greater than threshold angle $\theta_T$ 801, and VR device 100 may display the UI (e.g., menu 550) based on determining that angle of rotation 820-3 is greater than threshold angle $\theta_T$ 801.

In certain implementations, VR device 100 may selectively display a UI or portions of the UI based on a combination of two or more detected rotations. For example, as shown in FIG. 8E, if VR device 100 detects that an angle of initial rotation 830-1 exceeds threshold angle $\theta_T$ 801, VR device 100 may display the UI, as described above with respect to FIG. 8D. However, VR device 100 may cease displaying UI or may display only a portion of the UI if user 101 rotates back by an angle of secondary rotation 840-1 that is in the opposite angular direction as angle of initial rotation 830-1. For example, VR device 100 may cease displaying the UI (or may display only a portion of the UI) even though a total angle of rotation from a beginning point associated with angle of initial rotation 830-1 and angle of secondary rotation 840-1 would exceeds threshold angle $\theta_T$ 801, as shown in FIG. 8E.

In another implementation, VR device 100 may consider both angle of initial rotation 830-1 and angle of secondary rotation 840-1 when determining whether to display the UI if the secondary rotation occurs (or is detected) within a threshold time (e.g., 2 seconds) after occurrence of the initial rotation. For example, VR device 100 may selectively display the UI (or may display only a portion of the UI) based on the total angle of rotation from a beginning point associated with angle of initial rotation 830-1 and angle of secondary rotation 840-1. For example, VR device 100 may selectively display the UI when angle of initial rotation 830-1 exceeds threshold angle $\theta_T$ 801 and may continue to present the UI despite angle of secondary rotation 840-1 in the opposite direction until the total detected rotation (e.g., angle of initial rotation 830-1 minus angle of secondary rotation 840-1) no longer exceeds threshold angle $\theta_T$ 801.

In another example, VR device 100 may consider two or more rotations in a same direction. In the example shown in FIG. 8F, VR device 100 may selectively display the UI when an angle of initial rotation 830-2 exceeds threshold angle $\theta_T$ 801 and may continue to present the UI when an angle of secondary rotation 840-2 occurs in the same direction. For instance, VR device 100 may continue to present the UI if the secondary rotation occurs (or is detected) within a threshold time (e.g., 2 seconds) after occurrence of the initial rotation. In one example, VR device 100 may continue to present the UI when angle of secondary rotation 840-2 in the same direction even if angle of secondary rotation 840-2 is less than threshold angle $\theta_T$ 801. In yet another example, VR device 100 may present the UI when angle of initial rotation 830-2 and angle of secondary rotation 840-2 occur in the same direction even if angle of initial rotation 830-2 and angle of secondary rotation 840-2 are each less than threshold angle $\theta_T$ 801. For example, VR device 100 may present the UI when two or more rotations in the same direction are detected and/or the total of angle of initial rotation 830-2 and angle of secondary rotation 840-2 is more than threshold angle $\theta_T$ 801.

In another implementation, VR device 100 may selectively present a UI based on multiple different types of sensor readings. For example, as described above with respect to FIG. 5E, VR device 100 may present menu 550 when user 101 swipes one or more touch sensors 110 (or makes another appropriate gesture). For example, VR device 100 may present menu 500 on a left side of display 500-E (as displayed in FIG. 5E) if user 101 swipes a touch sensor 110 on the left side of VR device 100, or VR device 100 may present menu 500 on a right side of a virtual display (not shown) if user 101 swipes a touch sensor 110 on a right side of VR device 100. VR device 100 may continue to present a UI (e.g., menu 550) if user 101 rotates in the same direction as the swipe. Conversely, VR device 100 may cease presenting the UI or may present only a portion of the UI if user 101, after making a swipe, rotates in a different direction from the swipe.

As described above with respect to FIG. 5E, VR device 100 may present the UI (e.g., menu 550) when an appropriate input (e.g., a swipe) is applied to touch sensor 110 (e.g., to present the UI on a portion of display 500-E when the swipe is detected by touch sensor 110 associated with that portion of the display). As further described above with respect to FIGS. 8D and 8F, VR device 100 may present display menu 550 when an angle of rotation 820-3 exceeds threshold angle $\theta_T$ 801 and/or if a combination of rotations (e.g., angle of initial rotation 830-2 and angle of secondary rotation 840-2) exceeds threshold angle $\theta_T$ 801. In certain examples, VR device 100 may cease presenting the UI (e.g., menu 550) if, for example, another gesture (e.g., a tap) is applied to touch sensor 110 (as discussed above with respect to FIGS. 5A and 5E) or if user 101, after rotating in direction 901 to cause the UI to be presented, rotates in an opposite direction, as discussed above with respect to FIG. 8E.

Figure 9A:
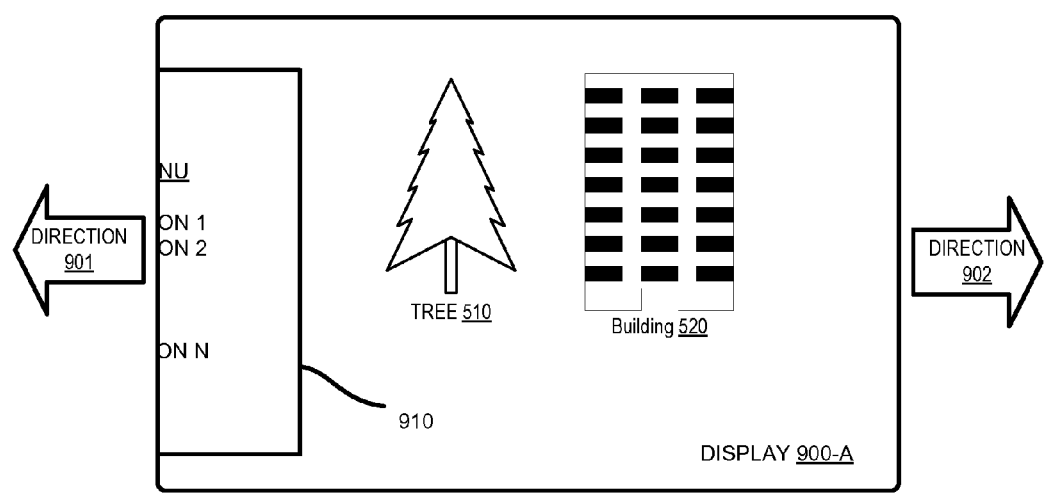
FIGS. 9A-9D show an exemplary displays having a UI that may be presented by the VR device shown in FIGS. 1A-1F and FIG. 2.

FIGS. 9A-9D show exemplary displays 900-A through 900-D having a UI or a portion of the UI that may be selectively presented by VR device 100. As shown in FIG. 9A, VR device 100 may selectively present a display 900-A that includes a UI portion 910 (e.g., a half or another portion of menu 550) on a part of display 900-A associated with a direction 901. For example, VR device 100 may present UI portion 910 if user 101 rotates in direction 901 by angle of rotation 820-2 that is less than threshold angle $\theta_T$ 801 (as discussed above with respect to FIG. 8C). Alternatively, VR device 100 may not present UI portion 910 if angle of rotation 820-2 is less than a lower threshold angle and may present UI portion 910 if user 101 rotates in direction 901 by angle of rotation 820-2 that is more than the lower threshold angle but is less than a higher threshold angle. In this last example, VR device 100 may present the entire UI (e.g., menu 550) if user 101 rotates in direction 901 by angle of rotation 820-2 that is more than the higher threshold angle. In other examples, VR device 100 may present UI portion 910 if user 101 rotates by angle of secondary rotation 840-1 in direction 902 that is opposite to direction 901 of angle of initial rotation 830-1 (as discussed above with respect to FIG. 8E). When presenting display 900-A, VR device may alter the displayed positioned of virtual elements (e.g., tree 510 and building 520 in display 900-B) based on, for example, movements and/or actions of user 101, while UI portion 910 stays in relatively the same position (e.g., portion 910 is anchored to display 900-A).

Figure 9B:
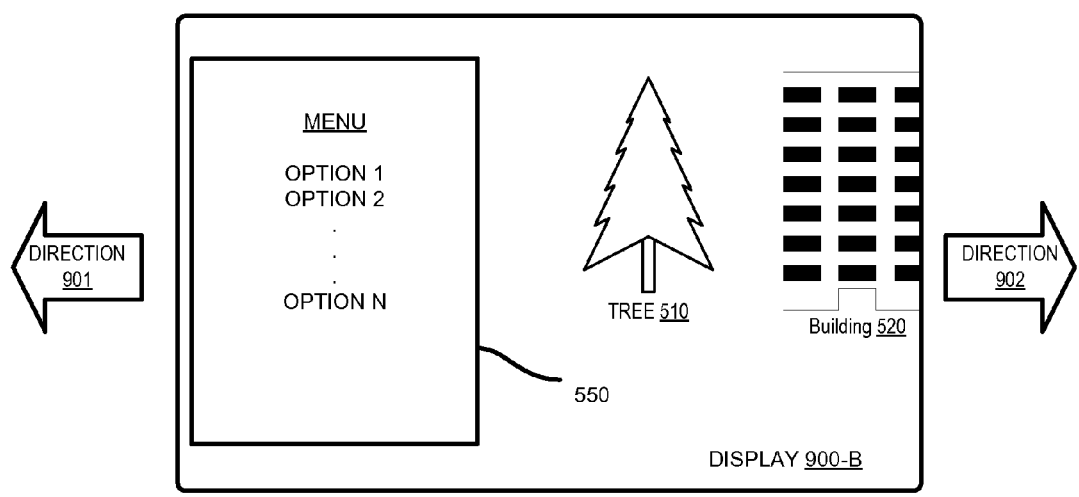

FIG. 9B shows another display 900-B in which VR device 100, after initially presenting menu 550 or another UI element (e.g., a described above with respect to FIG. 5E), may continue to present menu 550 despite other actions and/or motions by user 101. For example, VR device 100 may continue to display menu 550 for a period of time after the input and/or the initial rotation by user 101. In one example, VR device 100 may continue to display menu 550 while user 101 is making a selection from menu 550 or otherwise interacting with menu 550 (e.g., making an associated action via touch sensors 550), even after the period of time when VR device would normally cease presenting menu 550. In another example, VR device 100 may continue to present display 900-B that includes menu 550 if user 101 rotates by angle of secondary rotation 840-1 in direction 902 (that is opposite to direction 901 of angle of initial rotation 830-1 the initially prompted VR device 100 to present menu 550) when angle of secondary rotation 840-1 is less than a threshold amount.

In yet another example described above with respect to FIG. 8F, VR device 100 may initially present menu 550 after VR device 100 detects an angle of initial rotation 830-2 in direction 901 that exceeds threshold angle $\theta_T$ 801, and VR device may continue to present display 900-B that includes menu 550 while user 101 is rotating to in direction 901 (e.g., if angle of secondary rotation 840-2 is in the same direction as angle of initial rotation 830-2). When presenting display 900-B, VR device may alter the displayed positioned of virtual elements (e.g., tree 510 and building 520 in display 900-B) based on angle of initial rotation 830-2 and/or angle of secondary rotation 840-2. Thus, menu 550 in display 900-B may be presented in the substantially same location (e.g., portion 910 is anchored to display 900-A) while the background virtual elements continue to move based on the motions and/or actions of user 101.

Figure 9C:
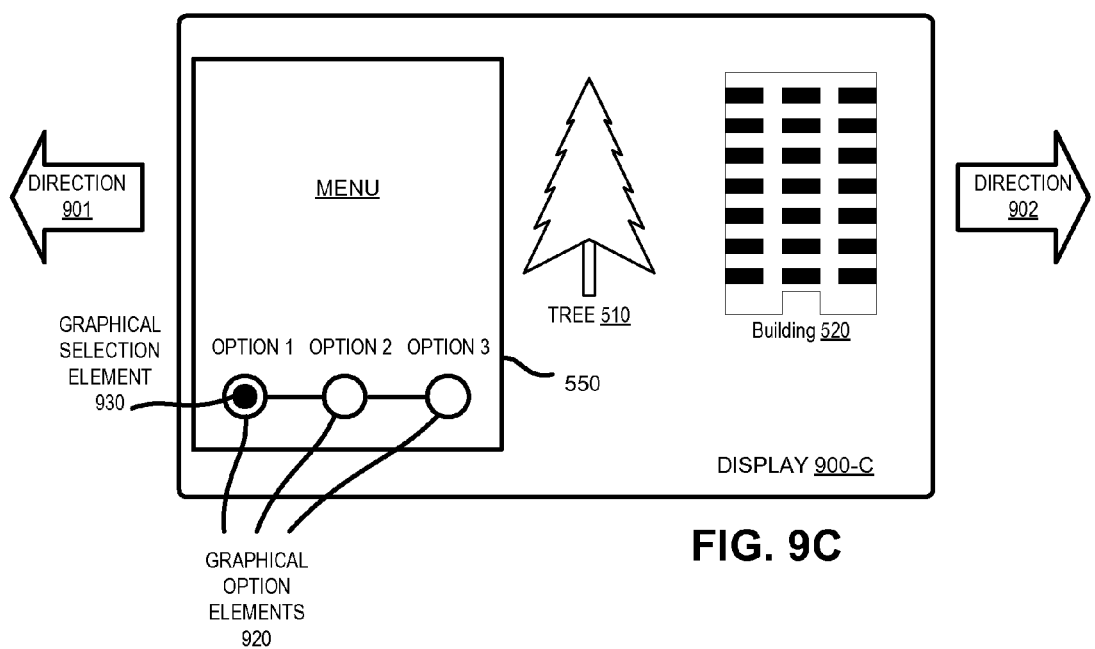
Figure 9D:
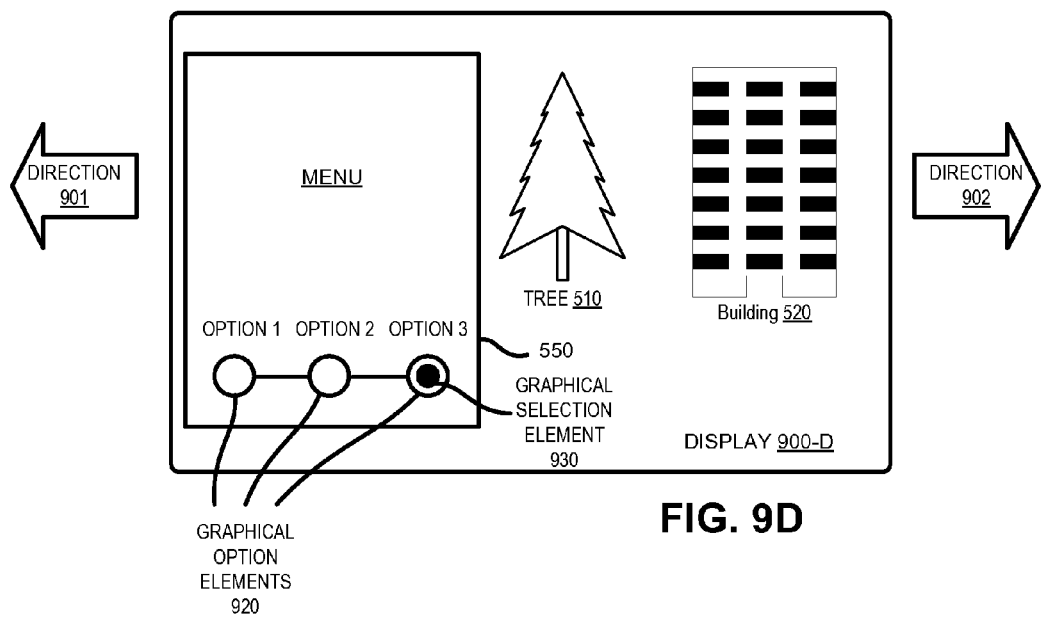

FIGS. 9C and 9D show displays 900-C and 900-D that may include two or more graphical option elements 920 identifying options that may be selected via menu 550 and/or another UI. As shown in FIGS. 9C and 9D, displays 900-C and 900-D may further include a graphical selection element 930 that graphically indicates one of graphical option elements 920 being selected by user 101. For instance, graphical selection element 930 is located in a left-most graphical option element 920 in display 900-C and graphical selection element 930 has been moved to the right-most graphical option element 920 in display 900-D. For example, user 101 may perform one or more gestures (e.g., a left or right swipe) via touch sensors 110 to move graphical selection element 930 among graphical option elements 920 and may perform one or more additional gestures (e.g., a tap) to indicate a final selection.

In another example, VR device 100 may track movements by user 101 and may adjust the position of graphical selection element 930 among graphical option elements 920 based on the movements of user 101. For example, VR device 100 may present display 900-C when a certain rotation by user 101 is detected (e.g., angle of rotation 820-3 that exceeds threshold angle $\theta_T$ 801 as discussed above with respect to FIG. 8D), and VR device 100 may further move graphical selection element 930 based on additional rotations by user 101. In one instance, VR device 100 may initially present menu 550 that includes graphical option elements 920 and/or graphical selection element 930 after a certain angle rotation by user 101, and VR device 100 may continue to present menu 550 when user 101 moves within a certain range (e.g., 10 degrees) of the angle of rotation. When user 101 moves within the range of the angles, VR device 100 may move graphical selection element 930 based on the movement. If user 101 moves outside the range of the angles (e.g., by more than 10 degrees), VR device 100 may cease presenting at least a portion of menu 550.

In still another example, VR device 100 may detect eye movements by user 101 (e.g., via front imaging device 460) and may move graphical selection element 930 based on the detected eye movements. For example, VR device 100 may initially present menu 550 based on detecting a gesture and/or rotation, and VR device 100 may enable a selection from graphic option elements 920 based on the detected eye movements. In one implementation, VR device 100 may move graphical selection element 930 based on the eye movements when the eye movements are within a threshold range of motion. If user 101 looks outside the displayed menu 550 or looks beyond the threshold range, VR device 100 may cease presenting at least a portion of menu 550.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 7, the order of the blocks in process 700 may be modified in other implementations. Furthermore, non-dependent blocks may be performed in parallel. Furthermore, process 700 may include additional and/or fewer blocks than shown in FIG. 7. Furthermore, although particular sensors, locations of sensors, types of motions, changes to a displayed VR environment, etc., are described herein, VR device 100 may operate with any mobile device or image generator that generates stereoscopic or VR displays to allow user 101 to interact with a VR environment by merely making gestures via VR device 100.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

What is claimed is:

1. A method comprising:
presenting, by a processor associated with a virtual reality (VR) device worn by a user, a virtual environment using first content received via a network from a network device;
detecting, by the processor, a first input by the user, wherein the first input relates to a first contact by the user with the VR device;
identifying, by the processor, attributes of the first input, wherein the attributes include at least one of a location on the VR device associated with the first contact or a direction of motion associated with the first contact;
determining, by the processor and based on the attributes of the first input, that the first input corresponds to a first swipe and a second swipe concurrently made by the user;
rendering, by the processor, a modified version of the presented virtual environment using second content received via the network from the network device based on the identified attributes of the first input, wherein rendering the modified version of the presented virtual environment includes:
moving, when both the first swipe and the second swipe are in an upward or a downward direction, a virtual horizon of the presented virtual environment in the upward or the downward direction, and
re-orienting the virtual horizon when the first and second swipes are in opposing directions;
detecting, by the processor, a second input by the user, wherein the second input relates to a second contact by the user with the VR device;
determining, by the processor, that a duration of the second contact exceeds a threshold amount of time;
capturing, by the processor, at least one of an image or a video of physical surroundings of the user; and
displaying, via a display associated with the VR device, the at least one of the image or the video during the second contact with the VR device.

2. The method of claim 1, wherein the VR device includes touch sensors, and wherein identifying the attributes of the first input includes:
identifying one or more of the touch sensors contacted by the user during the first input.

3. The method of claim 2, wherein the VR device includes a retaining device configured to retain a mobile communications device that includes a capacitive touch screen that displays the presented virtual environment,
wherein the touch sensors are electronically coupled to contact areas of the VR device that are positioned proximate to regions of the capacitive touch screen and can transfer a capacitance from the regions to the touch sensors via the coupling, and wherein detecting the first input includes detecting, by the capacitive touch screen, a change in the capacitance of the identified one or more of the touch sensors associated with the first input, and wherein the attributes of the first input are identified based on the change in the capacitance.

4. The method of claim 1, further comprising:
detecting, by the processor, a third input by the user, wherein the third input relates to a third contact by the user with the VR device; and
determining, based on the attributes, that the third input corresponds to one or more taps by the user on the VR device,
wherein rendering the modified version of the presented virtual environment further includes:
presenting a default version of the modified version of the presented virtual environment when the third input corresponds to a single tap by the user, and
designating the modified version of the presented virtual environment as the default version when the third input corresponds to multiple taps by the user.

5. The method of claim 1, further comprising:
determining, based on the attributes, that the first swipe corresponds to a first vertical swipe by one of the user's hands and the second swipe corresponds to a second vertical swipe by another one of the user's hands,
wherein re-orienting the virtual horizon includes:
rotating the virtual horizon when the first vertical swipe is in the upward direction and the second vertical swipe is in the downward direction.

6. The method of claim 1, further comprising:
detecting, by the processor, a third input by the user, wherein the third input relates to a third contact by the user with the VR device; and
determining, based on the attributes, that the first third input corresponds to a horizontal swipe by the user,
wherein rendering the modified version of the presented virtual environment further includes:
presenting, based on the horizontal swipe, a menu that includes one or more user-selectable options for rendering the modified version of the presented virtual environment.

7. The method of claim 1, further comprising:
detecting, by the processor, a third input by the user, wherein the third input relates to a third contact by the user with the VR device; and
determining, based on the attributes, that the third input corresponds to a hand rotation by the user,
wherein rendering the modified version of the presented virtual environment further includes:
enlarging, based on the hand rotation, one or more virtual objects included in the modified version of the presented virtual environment.

8. The method of claim 1,
wherein displaying the image or the video comprises superimposing the at least one of the image or the video over the modified version of the presented virtual environment, and wherein the method further comprises:
ceasing the displaying of the at least one of the image or the video when the user ends the second contact with the VR device.

9. A virtual reality (VR) device comprising:
a memory configured to store instructions; and
a processor configured to execute one or more of the instructions to:

present a virtual environment using first content received via a network from a network device;

detect a first input by a user, wherein the first input relates to a contact by the user with the VR device;

identify attributes of the first input, wherein the attributes include at least one of a location on the VR device associated with the first contact or a direction of motion associated with the first contact;

determine, based on the attributes of the first input, that the first input corresponds to a first swipe and a second swipe concurrently made by the user;

render a modified version of the presented virtual environment using second content received via the network from the network device based on the identified attributes of the first input, wherein to render the modified version of the presented virtual environment the processor is further configured to:

move, when both the first swipe and the second swipe are in an upward or a downward direction, a virtual horizon of the presented virtual environment in the upward or the downward direction, and re-orient the virtual horizon when the first and second swipes are in opposing directions;

detect a second input by the user, wherein the second input relates to a second contact by the user with the VR device;

determine that a duration of the second contact exceeds a threshold amount of time;

capture, based on the determination, at least one of an image or a video of physical surroundings of the user; and display, via a display associated with the VR device, the at least one of the image or the video during the second contact with the VR device.

10. The VR device of claim 9, further comprising:
touch sensors,
wherein the processor, when identifying the attributes of the first input, is further configured to:
identify one or more of the touch sensors contacted by the user during the first input.

11. The VR device of claim 10, further comprising:
a retaining device configured to retain a mobile communications device that includes a capacitive touch screen that displays the presented virtual environment;
contact areas positioned proximate to regions of the capacitive touch screen to transfer a capacitance from the regions to the touch sensors; and
leads that communicate the capacitance from the contact areas to the touch sensors,
wherein the processor, when detecting the first input, is further configured to detect a change in the capacitance of the identified one or more of the touch sensors associated with the first input, and wherein the processor is further configured to identify the attributes of the first input based on the change in the capacitance.

12. The VR device of claim 9, further comprising:
a motion sensor configured to detect a first head rotation by the user in a first direction, wherein the first head rotation is associated with an angle of rotation, and
wherein the processor is further configured to:
determine whether the angle of rotation exceeds a threshold, and
present a user interface when the angle of rotation exceeds the threshold.

13. The VR device of claim 12, wherein the motion sensor is further configured to detect, after the first head rotation, a second head rotation by the user, wherein the second head rotation is in a second direction that differs from the first direction; and
wherein the processor is further configured to cease presenting the user interface based on detecting the second head rotation.

14. The VR device of claim 12, wherein the user interface includes graphical option elements that identify options that are selectable by the user and a graphical selection element that identifies one of the graphical option elements being selected by the user,
wherein the motion sensor is further configured to detect, after the first head rotation, a second head rotation by the user, and
wherein the processor is further configured to move the graphical selection element among the graphical option elements based on the second head rotation.

15. The VR device of claim 9, wherein the processor, when displaying the image or the video, is further configured to superimpose the at least one of the image or the video over the modified version of the presented virtual environment, and
wherein the processor, when rendering the modified version of the presented virtual environment, is further configured to:
cease the display of the at least one of the image or the video when the user ends the second contact with the VR device.

16. A non-transitory computer-readable medium to store instructions, wherein the instructions comprise:
one or more instructions that, when executed by a processor associated with a virtual reality (VR) device worn by a user, cause the processor to:
present a virtual environment using first content received via a network from a network device;
detect a first input by the user, wherein the first input relates to a first contact by the user with the VR device;
identify attributes of the first input, wherein the attributes include at least one of a location on the VR device associated with the first contact or a direction of motion associated with the first contact;
determine, based on the attributes of the first input, that the first input corresponds to multiple vertical swipes concurrently made by the user;
render a modified version of the presented virtual environment using second content received via the network from the network device based on the identified attributes of the first input, wherein to render the modified version of the presented virtual environment the instructions further cause the processor to:
move, when both the first swipe and the second swipe are in an upward or a downward direction, a virtual horizon of the presented virtual environment in the upward or the downward direction, and
re-orient the virtual horizon when the first and second swipes are in opposing directions;
detect a second input by the user, wherein the second input relates to a second contact by the user with the VR device;
determine that a duration of the second contact exceeds a threshold amount of time;
capture, based on the determination, at least one of an image or a video of physical surroundings of the user; and display, via a display associated with the VR device, the at least one of the image or the video during the second contact of the VR device.

17. The non-transitory computer-readable medium of claim 16, wherein the VR device further includes touch sensors, and wherein the one or more instructions cause the processor, when identifying the attributes of the first input, to:
   identify one or more of the touch sensors contacted by the user during the first input.

18. The non-transitory computer-readable medium of claim 17, wherein the VR device further includes:
   a retaining device configured to retain a capacitive touch screen that displays the presented virtual environment,
   contact areas positioned proximate to regions of the capacitive touch screen to communicate a capacitance from the regions to the touch sensors, and
   leads that communicate the capacitance from the contact areas to the touch sensors, and
   wherein the one or more instructions cause the processor, when detecting the first input, to detect a change in the capacitance of the identified one or more of the touch sensors associated with the first input, and wherein the attributes of the first input are identified based on the change in the capacitance.

19. The non-transitory computer-readable medium of claim 16, wherein the one or more instructions further cause the processor to:
   detect a third input by the user, wherein the third input relates to a third contact by the user with the VR device; and
   determine, based on the attributes, that the further input corresponds to one or more taps by the user on the VR device,
   wherein the one or more instructions further cause the processor, when rendering the modified version of the presented virtual environment, to:
   present a default version of the presented virtual environment when the third input corresponds to a single tap by the user, and
   designate the presented virtual environment as the default version when the first third input corresponds to multiple taps by the user.

20. The non-transitory computer-readable medium of claim 16, wherein the one or more instructions further cause the processor, when rendering the modified version of the presented virtual environment, to:
   superimpose the image or the video over the modified version of the presented virtual environment.

* * * * *